(12) United States Patent
Lyden

(10) Patent No.: US 11,588,421 B1
(45) Date of Patent: Feb. 21, 2023

(54) RECEIVER DEVICE OF ENERGY FROM THE EARTH AND ITS ATMOSPHERE

(71) Applicant: Robert M. Lyden, Ashland, OR (US)

(72) Inventor: Robert M. Lyden, Ashland, OR (US)

( * ) Notice: Subject to any disclaimer, the term of this patent is extended or adjusted under 35 U.S.C. 154(b) by 18 days.

(21) Appl. No.: 16/542,043

(22) Filed: Aug. 15, 2019

(51) Int. Cl.
*H01F 27/28* (2006.01)
*H01F 38/14* (2006.01)
*H01G 4/002* (2006.01)
*H02J 50/12* (2016.01)
*H02N 99/00* (2006.01)

(52) U.S. Cl.
CPC .................................. *H02N 99/00* (2013.01)

(58) Field of Classification Search
USPC ......................................................... 307/104
See application file for complete search history.

(56) References Cited

U.S. PATENT DOCUMENTS

| | | | |
|---|---|---|---|
| 28,793 A | 6/1860 | Vion | |
| 129,179 A | 7/1872 | Harrison et al. | |
| 454,622 A | 6/1891 | Tesla | |
| 462,418 A | 11/1891 | Tesla | |
| 514,168 A | 2/1894 | Tesla | |
| 568,176 A | 9/1896 | Tesla | |
| 568,178 A | 9/1896 | Tesla | |
| 593,138 A | 11/1897 | Tesla | |
| 609,245 A | 8/1898 | Tesla | |
| 609,251 A | 8/1898 | Tesla | |
| 645,576 A | 3/1900 | Tesla | |
| 649,621 A | 5/1900 | Tesla | |
| 685,012 A | 10/1901 | Tesla | |
| 685,955 A | 11/1901 | Tesla | |
| 685,957 A | 11/1901 | Tesla | |
| 685,958 A | 11/1901 | Tesla | |
| 706,747 A | 8/1902 | Fessenden | |
| 787,412 A | 4/1905 | Tesla | |
| 803,684 A | 11/1905 | Fleming | |
| 841,387 A | 1/1907 | De Forest | |
| 879,532 A | 2/1908 | De Forest | |
| 1,113,149 A | 10/1914 | Armstrong | |
| 1,119,732 A | 12/1914 | Tesla | |
| 1,336,378 A | 4/1920 | Pupin et al. | |
| 1,342,885 A | 6/1920 | Armstrong | |
| 1,360,167 A | 11/1920 | Alexanderson | |
| 1,380,206 A | 5/1921 | Weagant | |
| 1,424,065 A | 7/1922 | Armstrong | |
| 1,540,998 A | 6/1925 | Plauson | |

(Continued)

FOREIGN PATENT DOCUMENTS

| | | |
|---|---|---|
| DE | 10107600 C1 | 8/2002 |
| EP | 1024550 A1 | 8/2000 |

(Continued)

OTHER PUBLICATIONS

"Jmbamboo", website http://home.att.net/jmbamboo/ from Nov. 30, 2002. Available from www.archive.org. 4 pages.

(Continued)

*Primary Examiner* — Toan T Vu
*Assistant Examiner* — Xuan Ly
(74) *Attorney, Agent, or Firm* — Westman, Champlin & Koehler, P.A.

(57) ABSTRACT

A receiver device of energy from the earth and its atmosphere for providing a supply of electric power.

31 Claims, 30 Drawing Sheets

(56) References Cited

U.S. PATENT DOCUMENTS

| | | | |
|---|---|---|---|
| 1,941,066 A | 12/1933 | Armstrong | |
| 1,991,236 A | 2/1935 | Van De Graaff | |
| 2,032,545 A | 3/1936 | McElrath | |
| 2,047,019 A | 7/1936 | Ferris | |
| 2,071,515 A | 2/1937 | Farnsworth | |
| 2,071,516 A | 2/1937 | Farnsworth | |
| 2,071,517 A | 2/1937 | Farnsworth | |
| 1,969,399 A | 8/1937 | Farnsworth | |
| 2,090,006 A | 8/1937 | Knoll et al. | |
| 2,091,439 A | 8/1937 | Farnsworth | |
| 2,135,615 A | 11/1938 | Farnsworth | |
| 2,139,813 A | 12/1938 | Farnsworth | |
| 2,140,285 A | 12/1938 | Farnsworth | |
| 2,140,832 A | 12/1938 | Farnsworth | |
| 2,141,827 A | 12/1938 | Farnsworth | |
| 2,141,837 A | 12/1938 | Farnsworth | |
| 2,141,838 A | 12/1938 | Farnsworth | |
| 2,143,262 A | 1/1939 | Farnsworth | |
| 2,161,620 A | 6/1939 | Farnsworth | |
| 2,172,152 A | 9/1939 | Farnsworth | |
| 2,174,487 A | 9/1939 | Farnsworth | |
| 2,179,996 A | 11/1939 | Farnsworth et al. | |
| 2,184,910 A | 12/1939 | Farnsworth | |
| 2,203,048 A | 6/1940 | Farnsworth | |
| 2,204,479 A | 6/1940 | Farnsworth | |
| 2,217,417 A | 10/1940 | Peterson | |
| 2,217,860 A | 10/1940 | Farnsworth | |
| 2,260,613 A | 10/1941 | Farnsworth | |
| 2,263,032 A | 11/1941 | Farnsworth | |
| 2,274,194 A | 2/1942 | Farnsworth | |
| 2,286,076 A | 6/1942 | Farnsworth | |
| 2,311,981 A | 2/1943 | Farnsworth | |
| 2,460,707 A | 2/1949 | Moray | |
| 2,590,863 A | 4/1952 | Jacobs et al. | |
| 2,802,127 A | 8/1957 | Dobischek et al. | |
| 2,813,242 A * | 11/1957 | Crump | H04B 1/1607 363/18 |
| 2,842,706 A | 7/1958 | Dobischek et al. | |
| 2,845,558 A | 7/1958 | Stec | |
| 2,922,905 A | 1/1960 | Van De Graaff | |
| 2,943,225 A | 6/1960 | Firth et al. | |
| 3,258,402 A | 6/1966 | Farnsworth | |
| 3,331,108 A | 7/1967 | Fisher et al. | |
| 3,386,883 A | 6/1968 | Farnsworth | |
| 3,530,497 A | 9/1970 | Hirsch et al. | |
| 3,533,910 A | 10/1970 | Hirsch | |
| 3,694,754 A | 9/1972 | Baltzer | |
| 3,844,840 A | 10/1974 | Bender | |
| 4,173,229 A | 11/1979 | Halton | |
| 4,200,904 A | 4/1980 | Doan | |
| 4,204,147 A | 5/1980 | Larrabee | |
| 4,224,082 A | 9/1980 | Jacobson | |
| 4,281,369 A | 7/1981 | Batte | |
| 4,295,189 A | 10/1981 | Boys | |
| 4,365,106 A | 12/1982 | Pulvari | |
| 4,414,252 A | 11/1983 | Lampkin | |
| 4,532,537 A | 7/1985 | Kane | |
| 4,563,630 A | 1/1986 | Woodward et al. | |
| 4,609,770 A | 9/1986 | Nishiura et al. | |
| 4,636,579 A | 1/1987 | Hanak et al. | |
| 4,670,293 A | 6/1987 | Yamano et al. | |
| 4,689,874 A | 9/1987 | Nishiura et al. | |
| 4,717,790 A | 1/1988 | Gochermann | |
| 4,718,185 A | 1/1988 | Conlin et al. | |
| 4,760,325 A * | 7/1988 | Suzuki | H03J 3/24 348/731 |
| 4,768,738 A | 9/1988 | Weinert | |
| 4,841,416 A | 6/1989 | Doss | |
| 4,873,790 A | 10/1989 | Laterza | |
| 4,881,022 A | 11/1989 | Boys | |
| 4,989,124 A | 1/1991 | Shappell | |
| 5,085,900 A | 2/1992 | Hamlett | |
| 5,126,585 A | 6/1992 | Boys | |
| 5,149,188 A | 9/1992 | Robbins | |
| 5,270,636 A | 12/1993 | Lafferty | |
| 5,293,308 A | 3/1994 | Boys et al. | |
| 5,315,227 A | 5/1994 | Pierson et al. | |
| D353,014 S | 11/1994 | Elazar | |
| 5,385,848 A | 1/1995 | Grimmer | |
| 5,433,259 A | 7/1995 | Faludy | |
| 5,450,305 A | 9/1995 | Boys et al. | |
| 5,455,767 A | 10/1995 | Staerker | |
| 5,460,441 A | 10/1995 | Hastings et al. | |
| 5,478,407 A | 12/1995 | Dorison et al. | |
| 5,482,569 A | 1/1996 | Ihara et al. | |
| 5,528,113 A | 6/1996 | Boys et al. | |
| 5,564,816 A | 10/1996 | Arcadia et al. | |
| 5,584,940 A | 12/1996 | Yoshida | |
| 5,592,074 A | 1/1997 | Takehara | |
| 5,611,176 A | 3/1997 | Juengert et al. | |
| 5,619,078 A | 4/1997 | Boys et al. | |
| 5,674,325 A | 10/1997 | Albright et al. | |
| 5,703,468 A | 12/1997 | Petrillo | |
| 5,787,649 A | 8/1998 | Popowych et al. | |
| 5,821,638 A | 10/1998 | Boys et al. | |
| 5,863,354 A | 1/1999 | Yoshida | |
| 5,898,579 A | 4/1999 | Boys et al. | |
| 5,969,497 A | 10/1999 | McDonald et al. | |
| 6,020,658 A | 2/2000 | Woodhead et al. | |
| 6,049,315 A | 4/2000 | Meyer | |
| 6,060,658 A | 5/2000 | Yoshida et al. | |
| 6,099,637 A | 8/2000 | Cordaro | |
| 6,100,663 A | 8/2000 | Boys et al. | |
| 6,124,378 A | 9/2000 | Cordaro et al. | |
| 6,127,799 A | 10/2000 | Krishnan | |
| 6,160,215 A | 12/2000 | Curtin | |
| 6,168,968 B1 | 1/2001 | Umemoto et al. | |
| 6,188,179 B1 | 2/2001 | Boys et al. | |
| 6,211,043 B1 | 4/2001 | Nishio et al. | |
| 6,218,998 B1 | 4/2001 | Van Voorhies | |
| 6,224,016 B1 | 5/2001 | Lee et al. | |
| 6,237,521 B1 | 5/2001 | Müller | |
| 6,238,521 B1 | 5/2001 | Sing et al. | |
| 6,271,053 B1 | 8/2001 | Kondo | |
| 6,294,722 B1 | 9/2001 | Kondo et al. | |
| 6,300,158 B1 | 10/2001 | Simburger et al. | |
| 6,310,281 B1 | 10/2001 | Wendt et al. | |
| 6,313,394 B1 | 11/2001 | Shugar et al. | |
| 6,327,994 B1 | 12/2001 | Labrador | |
| 6,343,440 B1 | 2/2002 | Ayers | |
| 6,380,477 B1 | 4/2002 | Curtin | |
| 6,437,231 B2 | 8/2002 | Kurata et al. | |
| 6,455,767 B1 | 9/2002 | Müller | |
| 6,476,766 B1 | 11/2002 | Cohen | |
| 6,480,366 B1 | 11/2002 | Cordaro | |
| 6,483,202 B1 | 11/2002 | Boys | |
| 6,507,169 B1 | 1/2003 | Holtom et al. | |
| 6,543,725 B1 | 4/2003 | Meurer et al. | |
| 6,552,405 B2 | 4/2003 | Sugawara et al. | |
| 6,565,701 B1 | 5/2003 | Jerabek et al. | |
| 6,576,290 B2 | 6/2003 | Cordaro et al. | |
| 6,621,183 B1 | 9/2003 | Boys | |
| 6,705,441 B1 | 3/2004 | Boys et al. | |
| 6,903,532 B2 | 6/2005 | Boys et al. | |
| 6,974,110 B2 | 12/2005 | Grandies | |
| 6,975,198 B2 | 12/2005 | Baarman et al. | |
| 7,126,450 B2 | 10/2006 | Baarman et al. | |
| 7,145,513 B1 | 12/2006 | Cohen | |
| 7,212,414 B2 | 5/2007 | Baarman | |
| 7,233,222 B2 | 6/2007 | Baarman et al. | |
| 7,279,850 B2 | 10/2007 | Boys et al. | |
| 7,385,357 B2 | 6/2008 | Kuennen et al. | |
| 7,439,712 B2 | 10/2008 | McCowen | |
| 7,462,951 B1 | 12/2008 | Baarman et al. | |
| 7,474,062 B2 | 1/2009 | Boys et al. | |
| 7,478,712 B2 | 1/2009 | McCowen | |
| 7,518,267 B2 | 4/2009 | Baarman | |
| 7,522,878 B2 | 4/2009 | Baarman | |
| 7,633,235 B2 | 12/2009 | Boys | |
| 7,741,734 B2 | 6/2010 | Joannopoulos et al. | |
| 7,781,916 B2 | 8/2010 | Boys | |
| 7,825,543 B2 | 11/2010 | Karalis et al. | |
| 7,969,269 B2 | 6/2011 | Boys et al. | |
| 8,319,091 B2 | 11/2012 | Lyden | |

(56) References Cited

U.S. PATENT DOCUMENTS

| | | | |
|---|---|---|---|
| 8,686,575 B2 | 4/2014 | McCowen | |
| 8,810,049 B2 | 8/2014 | McCowen | |
| 8,957,301 B2 | 2/2015 | Lyden | |
| D740,187 S | 10/2015 | Jamieson | |
| 9,331,603 B2 | 5/2016 | McCowen | |
| 9,479,086 B2 | 10/2016 | McCowen | |
| 9,716,464 B2 | 7/2017 | Collins | |
| 10,030,917 B1 | 7/2018 | Cohen | |
| 2001/0020485 A1 | 9/2001 | Ford et al. | |
| 2001/0035205 A1 | 11/2001 | Kurata et al. | |
| 2002/0000242 A1 | 1/2002 | Matushiita et al. | |
| 2002/0092558 A1 | 7/2002 | Kim et al. | |
| 2002/0129849 A1 | 9/2002 | Heckeroth | |
| 2002/0134422 A1 | 9/2002 | Bauman et al. | |
| 2002/0139411 A1 | 10/2002 | Hiraishi et al. | |
| 2002/0153037 A1 | 10/2002 | Fischer | |
| 2002/0157702 A1 | 10/2002 | Cordaro | |
| 2002/0158584 A1 | 10/2002 | Cordaro | |
| 2002/0168474 A1 | 11/2002 | Cordaro et al. | |
| 2002/0182769 A1 | 12/2002 | Campbell | |
| 2002/0184833 A1 | 12/2002 | Jones | |
| 2003/0029493 A1 | 2/2003 | Plessing | |
| 2003/0041894 A1 | 3/2003 | Sverdrup, Jr. et al. | |
| 2003/0113481 A1 | 6/2003 | Huang et al. | |
| 2003/0127127 A1 | 7/2003 | Inamasu et al. | |
| 2003/0127128 A1 | 7/2003 | Fabick et al. | |
| 2003/0141417 A1 | 7/2003 | Cordaro | |
| 2003/0188777 A1 | 10/2003 | Gaudiana et al. | |
| 2004/0200522 A1 | 10/2004 | Fukawa et al. | |
| 2004/0211456 A1 | 10/2004 | Brown et al. | |
| 2004/0211459 A1 | 10/2004 | Suenaga et al. | |
| 2004/0221886 A1 | 11/2004 | Oono | |
| 2006/0065302 A1 | 3/2006 | Gibson et al. | |
| 2008/0054638 A1 | 3/2008 | Greene et al. | |
| 2008/0067874 A1 | 3/2008 | Tseng | |
| 2008/0129639 A1* | 6/2008 | Mitsugi | H01Q 9/0421 343/876 |
| 2008/0191580 A1 | 8/2008 | Deyo | |
| 2008/0278264 A1 | 11/2008 | Karalis et al. | |
| 2009/0045773 A1 | 2/2009 | Pandya et al. | |
| 2009/0129126 A1 | 5/2009 | Boys | |
| 2009/0195332 A1 | 8/2009 | Joannopoulos et al. | |
| 2009/0195333 A1 | 8/2009 | Joannopoulos et al. | |
| 2009/0224856 A1 | 9/2009 | Karalis et al. | |
| 2009/0267709 A1 | 10/2009 | Joannopoulos et al. | |
| 2009/0267710 A1 | 10/2009 | Joannopoulos et al. | |
| 2009/0284083 A1 | 11/2009 | Karalis et al. | |
| 2009/0302688 A1 | 12/2009 | Boys | |
| 2010/0019604 A1 | 1/2010 | Sivasubramaniam et al. | |
| 2010/0096934 A1 | 4/2010 | Joannopoulos et al. | |
| 2010/0102639 A1 | 4/2010 | Joannopoulos et al. | |
| 2010/0102640 A1 | 4/2010 | Joannopoulos et al. | |
| 2010/0102641 A1 | 4/2010 | Joannopoulos et al. | |
| 2010/0109445 A1 | 5/2010 | Kurs et al. | |
| 2010/0117455 A1 | 5/2010 | Joannopoulos et al. | |
| 2010/0117456 A1 | 5/2010 | Karalis et al. | |
| 2010/0123353 A1 | 5/2010 | Joannopoulos et al. | |
| 2010/0123354 A1 | 5/2010 | Joannopoulos et al. | |
| 2010/0123355 A1 | 5/2010 | Joannopoulos et al. | |
| 2010/0127573 A1 | 5/2010 | Joannopoulos et al. | |
| 2010/0127574 A1 | 5/2010 | Joannopoulos et al. | |
| 2010/0127575 A1 | 5/2010 | Joannopoulos et al. | |
| 2010/0133918 A1 | 6/2010 | Joannopoulos et al. | |
| 2010/0133919 A1 | 6/2010 | Joannopoulos et al. | |
| 2010/0133920 A1 | 6/2010 | Joannopoulos et al. | |
| 2010/0141042 A1 | 6/2010 | Kesler et al. | |
| 2010/0148589 A1 | 6/2010 | Hamam et al. | |
| 2010/0164296 A1 | 7/2010 | Kurs et al. | |
| 2010/0164297 A1 | 7/2010 | Kurs et al. | |
| 2010/0164298 A1 | 7/2010 | Karalis et al. | |
| 2010/0171368 A1 | 7/2010 | Schatz et al. | |
| 2010/0171370 A1 | 7/2010 | Karalis et al. | |
| 2010/0181844 A1 | 7/2010 | Karalis et al. | |
| 2010/0187911 A1 | 7/2010 | Joannopoulos et al. | |
| 2010/0201205 A1 | 8/2010 | Karalis et al. | |
| 2010/0201314 A1* | 8/2010 | Toncich | H02J 7/007 320/108 |
| 2010/0207399 A1* | 8/2010 | Grandies | H02N 11/002 290/1 R |
| 2010/0207458 A1 | 8/2010 | Joannopoulos et al. | |
| 2010/0219694 A1 | 9/2010 | Kurs et al. | |
| 2010/0225175 A1 | 9/2010 | Karalis et al. | |
| 2010/0231053 A1 | 9/2010 | Karalis et al. | |
| 2010/0237706 A1 | 9/2010 | Karalis et al. | |
| 2010/0237707 A1 | 9/2010 | Karalis et al. | |
| 2010/0237708 A1 | 9/2010 | Karalis et al. | |
| 2010/0253152 A1 | 10/2010 | Karalis et al. | |
| 2010/0259108 A1 | 10/2010 | Giler et al. | |
| 2010/0264745 A1 | 10/2010 | Karalis et al. | |
| 2010/0277005 A1 | 11/2010 | Karalis et al. | |
| 2010/0289340 A1 | 11/2010 | Boys et al. | |
| 2010/0327660 A1 | 12/2010 | Karalis et al. | |
| 2010/0327661 A1 | 12/2010 | Karalis et al. | |
| 2011/0002574 A1 | 1/2011 | Bermel et al. | |
| 2011/0012431 A1 | 1/2011 | Karalis et al. | |
| 2011/0018361 A1 | 1/2011 | Karalis et al. | |
| 2011/0025131 A1 | 2/2011 | Karalis et al. | |
| 2011/0043046 A1 | 2/2011 | Joannopoulos et al. | |
| 2011/0043047 A1 | 2/2011 | Karalis et al. | |
| 2011/0043048 A1 | 2/2011 | Karalis et al. | |
| 2011/0043049 A1 | 2/2011 | Karalis et al. | |
| 2011/0049996 A1 | 3/2011 | Karalis et al. | |
| 2011/0049998 A1 | 3/2011 | Karalis et al. | |
| 2011/0069339 A1 | 3/2011 | Huang et al. | |
| 2011/0074218 A1 | 3/2011 | Karalis et al. | |
| 2011/0074346 A1 | 3/2011 | Hall et al. | |
| 2011/0074347 A1 | 3/2011 | Karalis et al. | |
| 2011/0105020 A1 | 5/2011 | Boys et al. | |
| 2011/0116290 A1 | 5/2011 | Boys | |
| 2011/0133570 A1 | 6/2011 | Mayo et al. | |
| 2011/0140544 A1 | 6/2011 | Karalis et al. | |
| 2011/0148219 A1 | 6/2011 | Karalis et al. | |
| 2011/0162895 A1 | 7/2011 | Karalis et al. | |
| 2012/0181973 A1 | 7/2012 | Lyden | |
| 2013/0157729 A1* | 6/2013 | Tabe | H04W 52/0245 977/932 |
| 2014/0043861 A1* | 2/2014 | Luh | H02M 3/3376 363/17 |
| 2014/0191843 A1* | 7/2014 | DeCou | B60R 25/24 340/5.61 |
| 2015/0001966 A1* | 1/2015 | McGowen | H05F 7/00 307/149 |
| 2019/0020117 A1* | 1/2019 | Cohen | H01Q 1/36 |

FOREIGN PATENT DOCUMENTS

| | | |
|---|---|---|
| GB | 191417811 A | 5/1915 |
| GB | 191505591 A | 8/1915 |
| GB | 191514311 A | 8/1916 |
| GB | 121561 A | 12/1918 |
| JP | H05152596 A | 6/1993 |
| JP | H05226681 A | 9/1993 |
| JP | H11168228 A | 6/1999 |

OTHER PUBLICATIONS

"Xantrex Technology Inc." website www.xantrex.com/product.asp?did=133 from Dec. 4, 2002, available from www.archive.org. 2 pages.

S.L. Wilkinson, "Electric Vehicles Gear Up" Chem. Eng. News., Oct. 13, 1997. 12 Pages.

K. Kurani et al, "The Marketability of Electric Vehicles: Battery Performance and Consumer Demand for Driving Range" 11th Annual Battery Conf. on Applications and Advances, p. 153-158. (1996).

"An Electric Vehicle Education Program" website http://www.science.sunbaru.com/teaching_ideas/constancejohnson.shtml, available from www.archive.org. 3 pages.

Lyden Letter to Govenor Arnold Schwarzenegger, Mar. 1, 2004.

Lyden Letter To Governor Arnold Schwarzenegger, Mar. 11, 2004.

"Partnership Plans to Commercialize Holographic Solar PV," Renewable Energy Access.com, 2 pages, Mar. 14, 2005.

(56) References Cited

OTHER PUBLICATIONS

"Konarka to Provide Camouflage—Pattern Solar," Renewable Energy Access.com, 2 pages, May 6, 2005.
"Solar Project Challenges Other Investment Options," Renewable Energy Access . com, 2 pages, May 11, 2005.
"Quantum Dots Could Double Solar PV Efficiency," Renewable Energy Access . com, 2 pages, May 24, 2005.
"Kyocera Completes Car Port 'Solar Grove'," Renewable Energy Access . com, 2 pages, Jun. 27, 2005.
"Seeing the Holographic Solar Answer," Renewable Energy Access . com, 1 page, Jul. 7, 2005.
"Cost Competitive Solar Called 'Imminent'," Renewable Energy Access . com, 2 pages, Jul. 21, 2005.
"Inventor Grows Energy-Saving 'Tree'," by Amanda Baillie, Sierra Vista Herald, The Arizona Republic, Aug. 6, 2005.
"GE's Discovery Advances Solar Energy," Renewable Energy Access . com, 1 page, Aug. 22, 2005.
"PV Powered,"Website, 1 page, Sep. 28, 2005.
"Nanosolar," Website, 4 pages, Sep. 28, 2005.
"Konarka," website, 4 pages, Sep. 28, 2005.
"Nanosys," website, 6 pages, Sep. 28, 2005.
"Global Solar," website, 5 pages, Sep. 28, 2005.
"Spheral Solar Power," website, 2 pages, Sep. 28, 2005.
"International Energy Outlook 2000," by Jay E. Hakes, Energy Information Administration, Mar. 6, 2000.
"Solar Electric Products Catalog," 10th Ed., Kyocera Solar, Inc., 2003.
"Home Power Journal," Issue 96, Aug.-Sep. 2003.
Earthflora.com, 10 pages from Website, Aug. 3, 2003.
"Stirling Energy Systems," Product Information from Website, 4 pages, Aug. 29, 2003.
World Oil Market and Oil Price Chronologies: 1970-2002, Energy Information Administration, Feb. 2003.
"Photovoltaic Paint?" by Richard Terra, 1 page.
Kingsolar.com, Product Information from Website, 4 pages, Aug. 29, 2003.
R Powr, Product Information, 2 pages.
Uni-Solar PV Shingles, www.cetsolar.com, 2 pages, Aug. 29, 2003.
Sunny Boy, Product Information, 2 pages.
Iowa Thin Film, Product Information, 11 pages, Aug. 3, 2003.
"Electricity Distribution," Wikipedia, 2 pages, Aug. 12, 2003.
"Electric Power Transmission," Wikipedia, 2 pages, Aug. 12, 2003.
"Researchers Move Closer to Plastic, Cheaper Solar Power Cells," by Carrie Peyton, 3 pages, Mar. 29, 2002.
"UC Berkeley, LBNL Chemists Develop Technology for Cheap Plastic Solar Cells," Press Release by UC Berkeley, 2 pages, Mar. 28, 2002.
Novel Material from Lucent's Bell Labs May Lead to Low-Cost, High-Performance Plastic Circuits, By Lucent Technologies, 2 pages, Mar. 29, 2000.
"Solar Cell Pushes Efficiency Barrier," by Spectrolab, 5 pages, Aug. 1, 2003.
"First Solar Technology Wins R&D Award," from SolarAccess.com website, 2 pages, Sep. 16, 2003.
"Superconducting Cables Will be Used to Supply Electricity to Consumers," from www.futureenergies.com webiste, 2 pages, Aug. 13, 2003.
"Can Solar Paint Be Far Behind," by Kelly Beebe, 1 page.
"N. Carolina Sustainable Energy Asso. Regarding PV Sunflower," from website, Sep. 29, 2003.
"UA Scientists are Developing 'Self-Assembling' Solar Cells," by Lori Stiles, 4 pages, Aug. 27, 2001.
Schwarzenegger Unveils 'Hydrogen Highways' Plan, from website, 2 pages, Apr. 22, 2004.
Tesla coil retrieved Jul. 26, 2022 from "https://en.wikipedia.org/w/index.php?title=Tesla_coil&oldid=1099395854".
Werner et al., "Fractal Antenna Engineering: The Theory and Design of Fractal Antenna Arrays," published in IEEE Antennas and Propagation Magazine,vol. 41, No. 5, Oct. 1999.

* cited by examiner

Fig. 9–1.(a) The potential distribution above the earth. (b) The potential distribution near a man in an open flat place.

PRIOR ART

PRIOR ART

PRIOR ART

PRIOR ART

PRIOR ART

PRIOR ART

PRIOR ART

RECEIVER DEVICE OF ENERGY FROM THE EARTH AND ITS ATMOSPHERE

FIELD

The present disclosure relates to a device of energy derived from the earth and its atmosphere for providing a supply of electric power.

BACKGROUND

Our planet is undergoing a dramatic period of climate change due at least in part to rapid growth of human population and the burning of fossil fuels. Accordingly, there is a great need for a clean and renewable source of energy for providing electric power.

There have been a number of individuals who have invented devices that were intended to provide energy obtained from the earth and its atmosphere, e.g., U.S. 28,793 by H. C. Vion in 1860, U.S. 129,179 by Mahlon Loomis in 1872, U.S. 182,172 by W. Crookes in 1876, U.S. 600,457 by N. B. Stubblefield in 1898, the "Condensing Dynamo" of Edward S. Farrow in 1911, U.S. Pat. No. 1,540,998 by Herman Plauson in 1921, U.S. Pat. No. 3,331,108 by C. Cristofv et al., and more recently U.S. 2008/0191580 by Harold Deyo in 2008, U.S. Pat. No. 6,974,110 for Method and Apparatus for Converting Electrostatic Potential Energy by Peter Grandics, and U.S. Pat. Nos. 7,439,712, 7,478,712, 8,686,575, 8,810,049, and 9,331,603, 9,479,086 by Clint McCowen assigned to Ion Power Group LLC. All of the aforementioned patents recited in his paragraph are hereby incorporated by reference herein.

Nicola Tesla invented AC current, electric motors, generators, coils, light bulbs, and contributed to making the hydro-electric power station at Niagara Falls. He was also granted patents relating to lighting, radio transmission, radiant energy, and superconductivity, e.g., U.S. 454,622, U.S. 462,418, U.S. 514,168, U.S. 568,176, U.S. 568,178, U.S. 593,138, U.S. 609,245, U.S. 609, 251 U.S. 649,621, U.S. 645,576, U.S. 685,012, U.S. 685,955, U.S. 685,957, U.S. 685,958, U.S. 787,412, and U.S. Pat. No. 1,119,732. All of the aforementioned patents recited in his paragraph are hereby incorporated by reference herein. Tesla described the earth as follows in U.S. 787,412 on page 3:

" . . . the planet behaves like a perfectly smooth or polished conductor of inappreciable resistance with capacity and self-induction uniformly distributed along the axis of symmetry of wave propagation and transmitting slow electrical oscillations without sensible distortion and attenuation."

In U.S. 787,412, on page 3, Tesla disclosed his belief that it was advantageous when attempting to transmit communications through the earth to use relatively low frequencies under 20,000 Hz, and irrespective of the frequency that is being used, the wave or wave train should continue for a certain interval of time, and in particular, not less than one-twelfth or probably 0.08484 of a second. In this regard, Tesla was attempting to create stationary waves in the earth and he was then treating the distance associated with the surface of the earth as a resonating antenna.

Further, there also exists an unconfirmed story that Tesla obtained a 1931 Pierce Arrow from the automobile plant in Buffalo, N.Y. near the site of the power station he helped to design at Niagara Falls, and then replaced the gasoline combustion motor with an 80 hp AC electric motor capable of turning 1800 rpm. The electric motor was allegedly provided with power from a black box device that Tesla made that measured approximately 2 feet long, 1 foot wide, and 6 inches high which contained 12 Type 70-L-7 vacuum tubes and some resistors. One of the problems with this information is that the Type 70-L-7 vacuum tube was not manufactured until some years later. The black box was allegedly connected with an antenna measuring 1.5 meters or about 6 feet long, and two small metal rods also protruded from the black box device. According to this story, Tesla connected the black box to some wiring, he pushed in the two metal rods and then indicated to a Mr. Petar Savo, who was a relative, the device was ready to use and the motor then had a viable source of electric power. Tesla instructed Savo to drive the car which was then allegedly tested for about week and at one point reached a maximum speed around 90 miles per hour. The modified Pierce Arrow was stored at a farmhouse location about 20 miles from Buffalo, N.Y.

Savo had allegedly served as a pilot for Austria-Hungary during World War I, and later told the story to a man named Derek Ahlers who was a designer and inventor in the aviation industry living in New York. Savo's identity has not been confirmed, and this has led to the authenticity of this story being disputed. The Applicant has studied the Russian language, and knows there could be many different ways to translate and spell the name Savo. Because his last name is derived from the Cyrillic alphabet and could possibly be translated in many different spellings into English, the task of tracing and establishing his identity could be difficult or impossible. According to one version of this story, a man named Lee de Forest called Savo a couple weeks later to inquire about the automobile experiment. It is known that de Forest was the inventor of the three electrode or triode vacuum tube, but also of early amplifiers and regenerative circuits. Moreover, the Applicant has determined that an individual named John Derek Ahlers lived in New York during this period, and he was a prominent aviation engineer who is now featured in an exhibit at the Smithsonian.

There is also a second source that supports this story of Tesla's experiment with the Pierce Arrow automobile. A man named Klaus Lebens who lives in Germany discovered in his deceased father's papers a letter from 1930 in which his father described first meeting with Nikola Tesla at the Waldorf Astoria in New York on Nov. 25, 1930, and then taking a ride in an electric 1930 Pierce Arrow the next day. At the time, Heinrich Jebens was an employee of the German Patent Office in Hamburg, and he had travelled to America to meet the world-famous inventors Thomas Edison, Nicola Tesla, and others. The Applicant is not in a position to know if the letter of Jebens is authentic, but on information and belief officials who work in the German or U.S. Patent Offices are not inclined to tell fables about technology and inventions. The 1930 Pierce Arrow that was allegedly modified by Tesla would have been wired positive ground, and been equipped with a six volt battery and an ignition coil as a stock vehicle coming from the factory. However, the fate and location of the 1930 Pierce Arrow vehicle is unknown, and no research notes by Tesla relating to this experiment are known to exist. Accordingly, it would be difficult or impossible to find information and evidence that could serve to confirm this story. In sum, we don't know if the Pierce Arrow story is a myth, or whether Tesla actually made and tested the electric vehicle. Moreover, if Tesla did succeed with an alternative energy experiment using a Pierce Arrow including an electric motor, we don't know the structure of the device, or how it worked because he never mentioned the possible automotive invention to the news media, and it does not appear in any of his patents.

The invention of the vacuum tube provided for making a possible amplifier, a modulator, oscillator, regulator, and an electronic switch for use, but also means for making large magnifications by way of oscillations and regenerative feedback. In this regard, the "Fleming valve" disclosed in U.S. 803,684 by J. A. Fleming in 1905, was followed by the work of Lee de Forest who is attributed with the invention of the "grid Audio" or first triode vacuum tube that was patented as U.S. 841,387 in 1907, and U.S. 879,532 in 1908. De Forest also combined two triode vacuum tubes to create a "cascade amplifier" and was involved in legal disputes with Edwin Howard Armstrong over the discovery of "regeneration," the "ultra audion" or the feedback circuit for which de Forest was granted U.S. Pat. No. 1,113,149 in 1914. In this regard. Armstrong was awarded U.S. Pat. Nos. 1,113,149, 1,336,378, 1,342,885, 1,424,065, and was also the inventor of frequency modulation or FM disclosed in U.S. Pat. No. 1,941,066. Other patents for vacuum tubes include U.S. Pat. No. 1,380,206 for a vacuum valve detector by R. A. Weagant, U.S. Pat. No. 2,047,019 for a grid structure by W. R. Ferris, U.S. Pat. No. 2,090,006 for electron discharge tube by M. Knoll et al., U.S. Pat. No. 2,217,417 for electron discharge apparatus by L. C. Peterson, and U.S. Pat. No. 2,460,707 for electrotherapeutic apparatus by T. H. Moray. Other patents for signaling and/or antennas include U.S. 706,747 by R. A. Fessenden in 1902, U.S. Pat. No. 1,360,167 by E. F. W. Alexanderson in 1920, U.S. Pat. No. 3,694,754 by Otto Baltzar, and U.S. Pat. No. 6,218,998 for Toroidal Helical Antenna by Kurt Louis Van Voorhies. All of the aforementioned patents recited in his paragraph are hereby incorporated by reference herein.

In accordance with Ohm's law which is I (current)=V (voltage)/R (resistance), there normally exists an inverse relationship between voltage and current. Accordingly, very high frequency voltage is normally associated very low current. High frequency voltage can be used to power certain electrical devices without generating the same amount of heat that is often associated with the use of high levels of current. For example, a florescent light does not normally generate the same amount of heat as does a conventionally wired and powered incandescent light which uses lower frequency voltage and also a resistive filament. In this regard, some of the aforementioned patents of Tesla, e.g., U.S. 454,622, teach the use of an inductor to achieve high frequencies of at least 15,000-20,000 cycles per second and also high voltage potentials of at least 20,000 volts in devices which can include resonating circuits, condensers, and means for causing rapid mechanical, magneto-electric, or disruptive discharge(s).

While not being bound to theory, the disclosure of the present application relates to the belief that voltage and current, dielectric capacity and magnetic inductance, are different aspects or parts of what is called "electricity" and they can appear together in various degrees, or they can very nearly or actually appear individually and to the near or complete exclusion of the other in certain conditions. An inductor which has generated high voltage but relatively low current that has suddenly been discharged into a high impedance load can provide one example of a cold form of electricity. In this regard, due to the sudden collapse of a magnetic field, high voltage can produce useful electrical energy in what can resemble a compression or pulse wave without high current then also being present when the electrical energy is discharged into a high impedance load. However, when conditions of high current and high voltage are both present, this can disrupt or prevent a similar compression or pulse wave from being easily communicated and which some individuals believe may travel along the skin or surface of a conductor. It may be the case that this compression or pulse wave travels substantially longitudinally and approximately at or near the speed of light in a conductor, and under certain conditions, also in the atmosphere and so-called empty space.

Alternatively, electrical energy without the presence of high voltage can be generated by the fluctuation of potentials in a low impedance circuit when relatively high current is being suddenly and repeatedly interrupted and the reflection of this fluctuation crosses between two negative terminals. The observed electrical energy may then take the form of a transverse wave. In a paper entitled "Conflicts Between Quantum Mechanics and Relativity," by Philo T. Farnsworth, which is believed to have been published by the Farnsworth Electronics Company of Fort Wayne, Ind. in the year 1956, he puts forth a theory that an observed magnetic field which is consistent with the right hand rule and is substantially perpendicular to the orientation and direction a straight wire could be the result of a mass inertial effect associated with and resulting from the movement of an electron along or in the wire.

Here is as good a place as any to state that due to a misunderstanding of electrical phenomenon by early scientists, what is normally called "negative" is actually positive, and vice-versa, that is, "positive" is negative. In this regard, negative earth is a source of electrons and other forms of electrical energy and has for practical purposes almost infinite capacity, and in a lightning strike the leader actually comes from the earth, and is then joined by one from the clouds as discussed and shown in The Feynman Lectures on Physics, Volume II, Chapter 9, entitled "Electricity and the Atmosphere." Accordingly, when studying some electrical diagrams it can sometimes be helpful to reverse the way most people commonly think about the origin and/or conduction of electrical power.

Both of these forms of electrical energy which are generated by relatively extreme conditions of either high voltage and low current or low voltage and high current conditions can sometimes be communicated via a conductor with relatively little or no resistance at normal temperatures. For at least these reasons, and others discussed in the patent references and scientific papers which are incorporated by reference herein, classical measurements and some so-called electrical laws and formulas may not accurately predict or describe electrical energy in circuits which are characterized by either of these two conditions, but real work can nevertheless be done.

Most vacuum or gas filled tubes use heated cathodes in order to provide electron emissions. However, cold cathode vacuum or gas filled tubes also exist, and they can have certain advantages over heated cathode vacuum tubes. For example, they do not need a battery or other power source to pre-heat the tubes and so there is no delay at start. They also consume less power for generating electron emission and produce less heat and so can provide a longer service life. Cold cathodes on vacuum tubes can include a coating, such as magnesium oxide. Once started, the emission of electrons from the coating can be self-sustaining provided a collector electrode of higher potential is present to attract the emitted electrons. Emission can be caused by exposure to ultraviolet light, or by bombarding the coating with electrons within the tube, or by excitation with a high frequency inductive coil or possible Tesla coil.

The following U.S. Patents disclose cold cathode vacuum tubes: U.S. Pat. No. 2,032,545, "Electron Tube," by H. B. McElrath; U.S. Pat. No. 2,943,225, "Cold Cathode Vacuum Tube Devices" by B. G. Firth et al. which discloses the use of a magnesium oxide coating; U.S. Pat. No. 2,184,910 "Cold Cathode Electron Discharge Tube, by Philo T. Farnsworth which discloses that its cathode can be excited by Tesla coil; U.S. Pat. No. 2,263,032, "Cold Cathode Electron Discharge Tube" by Farnsworth which discloses the use of Caesium and Barium; U.S. Pat. No. 2,590,863, "Cold Cathode Gas Tube Amplifier" by H. Jacobs, et al; U.S. Pat. No. 2,802,127, "Dynode Coating," and U.S. Pat. No. 2,842,706, "Cold Cathode Vacuum Tube," by D. Dobischek; and, U.S. Pat. No. 2,845,558, "Colt Cathode Vacuum Tube Means," by C. L. Stec. All of the aforementioned patents recited in his paragraph are hereby incorporated by reference herein. More information on prior art cold cathode tubes can be found on the following website: https://en.wikipedia.org/wiki/Cold_cathode.

Farnsworth was the inventor of television. He also designed many high power vacuum tubes and/or gas-filled tubes including photomultipliers, multipactors, IR imaging tubes, image storage tubes, and image amplifiers. Farnsworth described some of these tubes as self-oscillating and they used regenerative feedback and resonant reinforcement. Many of his tubes included metal components such as aluminum, barium, nickel, silver, tungsten, and coatings such as calcium, sodium, potassium, magnesium, and sometimes even soft radioactive materials such as nickel barium alloy, caesium, barium, strontium, and thorium as secondary emitters. In this regard, certain vacuum or gas filled tubes which include radioactive substances can be excited by high frequency voltage. For example, the magnetron used in many microwave ovens often contains a thoriated anode or cathode, and other vacuum or gas-filled electron tubes also exist that contain Pm-147, H-3, or Ni-63 which are low energy beta emitters. In this regard, thoriated tungsten has been used, e.g., in the following electron tubes: 01A, 3C24, 841, 4-65A, 10Y, 15E, 25T, 35T, 100TL and 801A.

The following patents of Farnsworth disclose vacuum or gas-filled tubes: U.S. Pat. Nos. 1,969,399, 2,071,515, 2,071,516, 2,071,517, 2,091,439 U.S. Pat. Nos. 2,135,615, 2,139,813, 2,140,285, 2,140,832, 2,141,827, 2,141,837, 2,141,838, 2,143,262, 2,161,620, 2,172,152, 2,174,487, 2,179,996, 2,203,048, 2,204,479, 2,217,860, 2,260,613, 2,263,032, 2,274,194, 2,286,076, 2,311,981, and all of these patents are hereby incorporated by reference herein.

In U.S. Pat. No. 2,091,439 filed in 1936 Farnsworth describes tubes that are cold cathode devices and which operate over-unity and recited: "All that is necessary to set the tube into oscillation, is to energize the anodes, as there will be, in the space between the cathodes, a sufficient number of free electrons which are accelerated toward one or both of the cathodes by the potential of the anode, to strike thereon and cause the initiation of secondary emissions."

In U.S. Pat. No. 2,139,813, "Secondary Emission Electrode," Farnsworth discloses a multipactor vacuum tube that can operate cold cathode also over unity, and because of its symmetrical electrode the tube can function with AC instead of DC.

In U.S. Pat. No. 2,140,832, "Means and Method of Controlling Electron Multipliers," Farnsworth indicates that the electrons do not reach the opposite surface before they get reversed, and this results in high output current. The oscillator power of this tube is indicated as 600 watts, and when used as an amplifier it could produce 1,000 watts.

In U.S. Pat. No. 2,143,262, "Means for Electron Multiplication," Farnsworth discloses that gain increases of between 100,000 to 1,000,000 are possible with a single multipactor. The disclosed tube was operated in an "interrupted" mode, that is, pulsed operation, and it was sensitive enough to self-oscillate or interrupt.

Some of Farnsworth's tubes included opposed curved cathodes, and they produced brilliant space suspended star-like "poissors" or plasmoids. Farnsworth was also able to achieve fusion in a vacuum tube, as disclosed in U.S. Pat. No. 3,258,402, "Electric Discharge Device For Producing Interactions Between Nuclei, and U.S. Pat. No. 3,386,883, "Method And Apparatus For Producing Nuclear-Fusion Reactions," but also see U.S. Pat. No. 3,530,497, "Apparatus For Generation Fusion Reactions" and U.S. Pat. No. 3,533,910, "Lithium Ion Source In Apparatus For Generating Fusion Reactions," by his former associated R. L. Hirsch, and all of these patents are hereby incorporated by reference herein.

In the 1950's, vacuum tubes were largely replaced by transistors for use in electronic devices, but in recent years NASA has developed a 460 GHz vacuum channel transistor which is faster than MOSFET transistors. Graphene transistors which are also much faster and powerful than conventional silicon transistors are also now being developed.

Farnsworth made some of the first television cameras, and some of his mutipactor and other vacuum tubes were designed for this application. For many years, RCA made photomultiplier tubes which could magnify the current produced by incident light by as much as 100 million times, and made available a widely used RCA Photomultiplier Manual, published in 1970. Hamamatsu is now the world leader in the photomultiplier industry and has its own handbook entitled Photomultiplier Tubes Basics and Applications published in 2014 that is available to the public on its company website. In some applications, semiconductor devices, and in particular avalanche photodiodes, can be used as an alternative to photomultipliers, but the latter are well-suited for detecting visible light and other forms of electrical energy which is not substantially collimated. Modern bolometers which are most often used to detect heat, light, and electromagnetic radiation can detect photons and other ionizing particles, but also non-ionizing particles and they also don't need to be heated or cooled in order to function. As a result, bolometers do not consume much power during operation.

After studying the Feynman Lectures on physics and work of Tesla and Farnsworth, and conducting experiments in electrical engineering, the Applicant believes that he has discovered certain phenomenon, and also how to make a receiver device that can use the naturally occurring energy of the earth and its atmosphere to provide useful electric power. The Feynman Lectures on Physics, Volume II, Chapter 9, entitled "Electricity and the Atmosphere," discloses that there is about 100 volts of electrical potential for every three feet of elevation above level ground. As shown in drawing FIG. 1, which corresponds to FIG. 9.1(a) therein, there is a potential of about 200 volts at an elevation of six feet. However, because human beings and many other structures and things are electrical conductors, we do not normally sense this electrical potential because if we attempt to reach out and touch it, the earth and its atmosphere quickly adjust so as to maintain an equipotential or near neutral state.

The difference in electrical potential between the ionosphere which includes positively charged ions and the earth which is negative ground is associated with lightning, and on the average there are about 100 strikes around the world every second. This phenomenon results in Schuman Resonance. As previously discussed, contrary to popular belief, it is the negative and not the positive electrical side which is the leader in a lightning strike. The most powerful Schuman Resonance when taking a 30 second average over a period of 8 hours corresponds to a peak of approximately 7.83 Hz, and also other smaller peaks having less power at approximately 14 Hz, 20 Hz, 26 Hz, 33 Hz, 39 Hz, and 45 Hz.

An antenna which is raised above the ground surface can also cause one of equal length to effectively extend beneath the ground surface. As discussed in the Marine Corps' MCRP 8-10B.11, "Antenna Handbook," published in June, 1999 (henceforth MCRP), on page 2-19. "A quarter-wave antenna erected vertically, with its lower end connected electrically to the ground . . . behaves like a half-wave antenna." While not being limited to the following hypothesis, the present disclosure relates to the belief that the raising of an antenna above the ground and resulting upward shift of the local atmospheric gradient of electrical energy may cause a corresponding upward shift of the local gradient of earth ground electrical energy beneath an antenna.

When a monopole antenna is raised and grounded the electrical potential measured between the atmosphere, antenna, and ground is changed very little relative to the equipotential state which is normally maintained between the atmosphere and ground, as show in drawing FIG. 2. In this regard, the measured voltage is commonly then in the range of micro micro volts or picovolts. However, when the same monopole antenna is subsequently disconnected from ground, the equipotential electrical gradient(s) in the atmosphere of approximately 100 volts every three feet, as previously shown in drawing FIG. 1, then return to their approximately normal condition as if the antenna was not present, as shown in drawing FIG. 3.

When the normal grounded state of the antenna is switched on and off many times per second, then the electrical gradient(s) of the atmosphere relative to the earth ground can be caused to alternate and move up and down or dance along the length of the antenna. This creates movement of electrons and/or a compression-like wave which can result in the generation of electrical current, and provides a way in which to receive and convert the naturally occurring electrical potential of the earth and its atmosphere for use in providing an abundant source of renewable energy.

In this regard, one possible source of this energy is the aforementioned electrical potential which exists as between the earth and its atmosphere. Further, a related and more specific source of energy is the earth's Schuman Resonance peak of approximately 7.83 Hz, and other smaller peaks having less power at approximately 14 Hz, 20 Hz, 26 Hz, 33 Hz, 39 Hz, and 45 Hz. Another source of energy is the so-called negative ground which includes the earth and which for practical purposes has near infinite capacity, and in part, because the earth has a metallic core and electromagnetic field. Telluric or earth currents also exist which vary in different locations around the world. Moreover, the earth and its atmosphere are being bombarded by solar wind and high energy radiation such as gamma rays which can cause and/or accelerate radioactive decay. It is also possible that the earth, solar system, Galaxy and Universe does contain what scientists in the late 19th and early 20th century and including Tesla commonly referred to as ether. In recent years, the existence of gravity waves has been confirmed. The Applicant teaches a receiver device that can tap into one or more of these possible sources of energy and then provide a source of electric power.

SUMMARY

An aspect of the present disclosure relates to a device configured to receive electrical energy from the electrical potential associated with the earth and its atmosphere, the device including an antenna comprising a top end and a bottom end, the bottom end of the antenna being in electrical communication with a grounding switch adapted to alternate between open and closed electrical communication with a ground, and at least one of the top end of the antenna and the bottom end of the antenna being in electrical communication with a diode.

Another aspect of the present disclosure relates to a device configured to receive electrical energy from the electrical potential associated with the earth and its atmosphere, the device including an antenna comprising a top end and a bottom end, the bottom end of the antenna being in electrical communication with a grounding switch adapted to alternate between open and closed electrical communication with a ground, the bottom end of the antenna being in electrical communication with a first diode, and the top end of the antenna being in electrical communication with a second diode.

Yet another aspect of the present disclosure relates to a device configured to receive electrical energy from the electrical potential associated with the earth and its atmosphere, the device including an antenna including a coil between a top end of the antenna and a bottom end of the antenna, the coil including at least one of a tap tuner and an air capacitor tuner, top end of the antenna including a fractal configuration including at least one of a toroid, a golden square, a golden triangle, and a golden spiral, the bottom end of the antenna in electrical communication with a grounding switch, the grounding switch including at least one of a mechanical switch, a fluid-mechanical mercury switch, an optical switch, a spark gap switch, an electronic circuit and timing chip switch, a transistor switch, a gas filled tube switch, a vacuum tube switch, and a hydrogen thyratron tube switch, wherein the grounding switch is adapted to alternate between an open and closed connection to a ground, a variable speed control in communication with the grounding switch, wherein the variable speed control is adapted to control the rate at which the grounding switch is opened and closed in electrical communication to the ground, at least one diode in electrical communication with at least one of the bottom end of the antenna and the top end of the antenna, at least one amplifier in electrical communication with the at least one diode, the at least one amplifier including at least one of a gas filled tube amplifier, a vacuum tube amplifier, cold cathode tube amplifier, a Farnsworth multipactor tube amplifier, a photomultiplier tube amplifier, and a bolometer amplifier, and a resistor and at least one of a capacitor, a battery, a load, and an electrical power grid in electrical communication with the at least one amplifier.

BRIEF DESCRIPTION OF THE DRAWINGS

FIG. 2 is subsequently disconnected from ground by an switch open to ground the electrical gradients in the atmosphere which correspond to approximately 100 volts every three feet shift downwards and return to their approximately normal condition.

Figure 4:
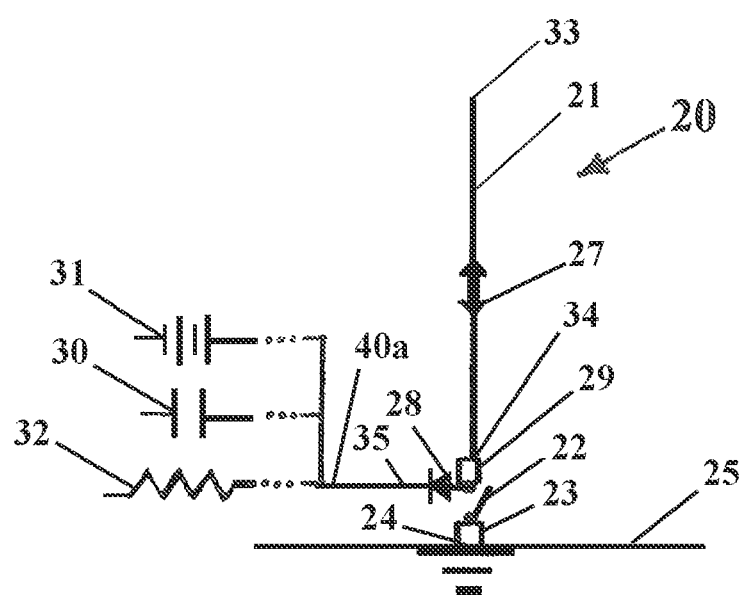

FIG. 4 shows an antenna which can alternatively be placed in closed or open communication by a switch to ground, but also a diode in a circuit.

Figure 5:
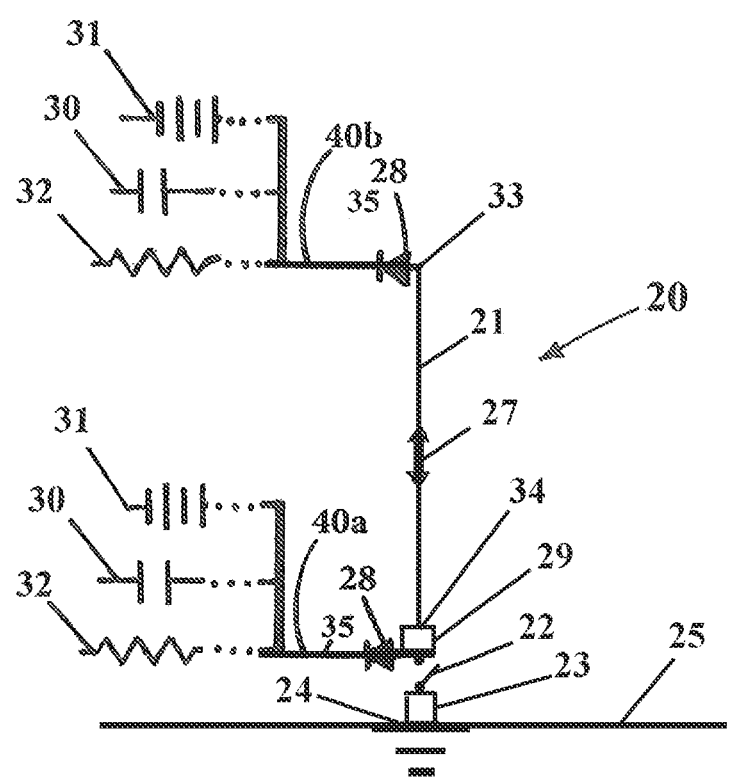

FIG. 5 shows an antenna which can alternatively be placed in communication with an open or closed switch to ground, but also two diodes in two circuits.

Figure 6:
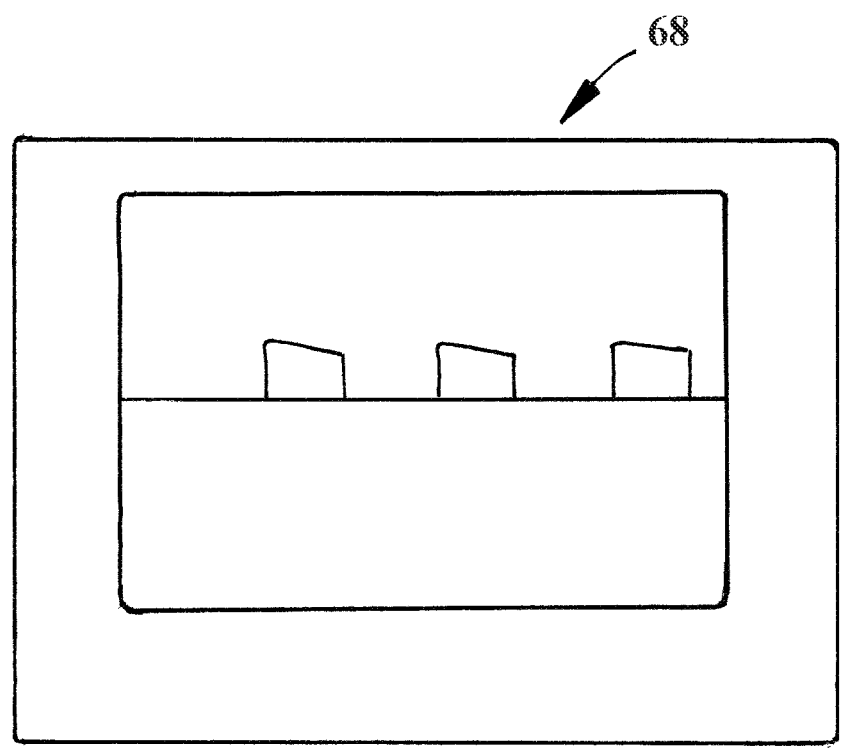

FIG. 6, shows a representation of the wave or pulse generated by the antenna, switch, earth ground, diode, and circuit configuration 40a shown in drawing FIG. 4 which can appear on an Oscilloscope device.

Figure 7:
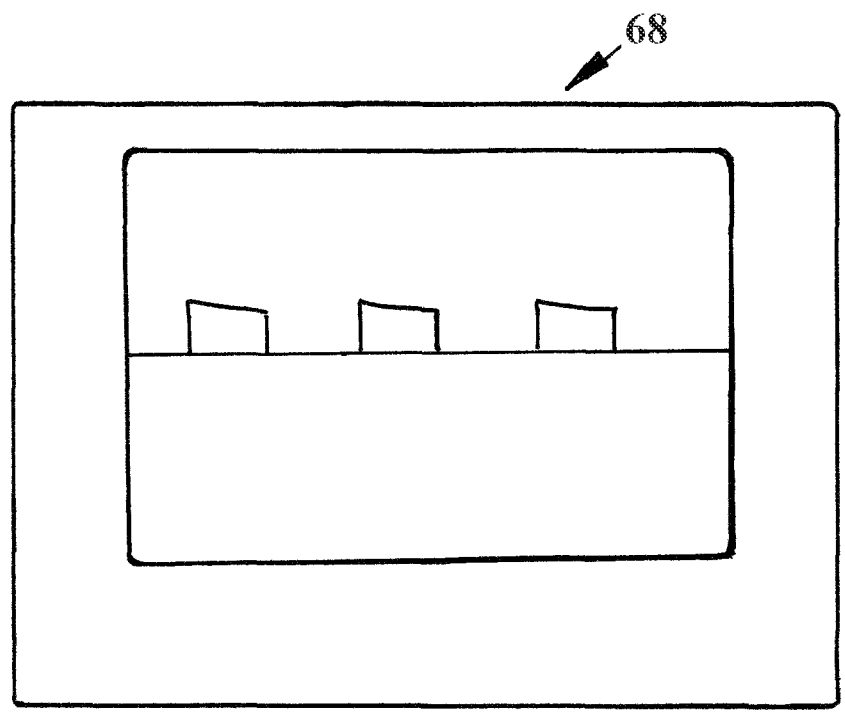

FIG. 7, shows a representation of the wave or pulse generated by the antenna, switch, earth ground, diode, and circuit configuration 40b shown in drawing FIG. 5 which can appear on an Oscilloscope device.

Figure 8:
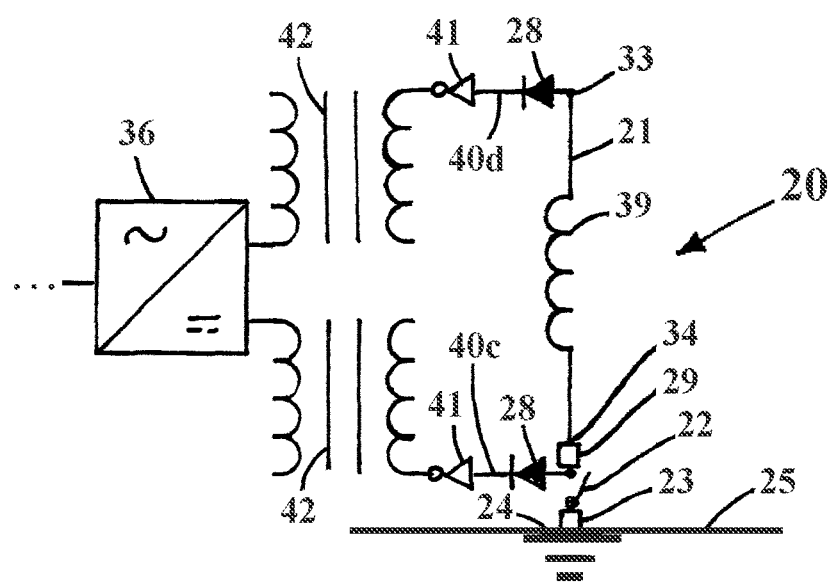

FIG. 8, shows the use of two inverters to change the DC output of two circuits into AC current, and also a rectifier for changing AC to DC current so that the DC output of the two circuits can be combined.

Figure 9:
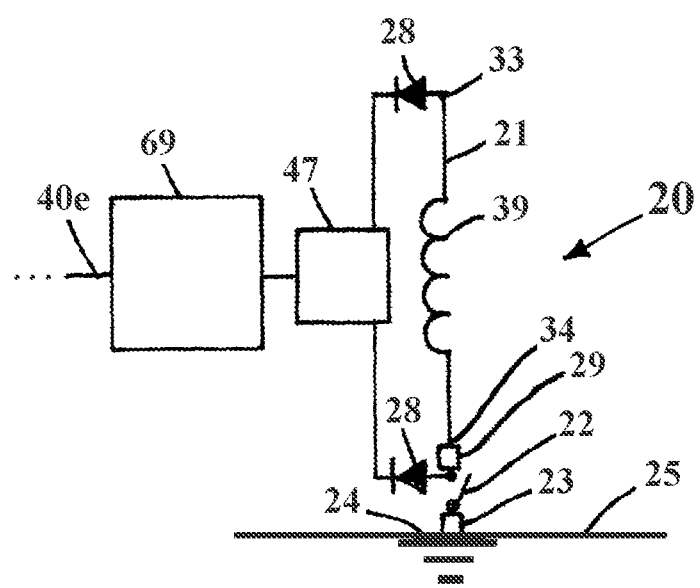

FIG. 9, shows the use of a DC combiner in order to combine the DC pulse output of two circuits and create a single DC current output.

Figure 10:
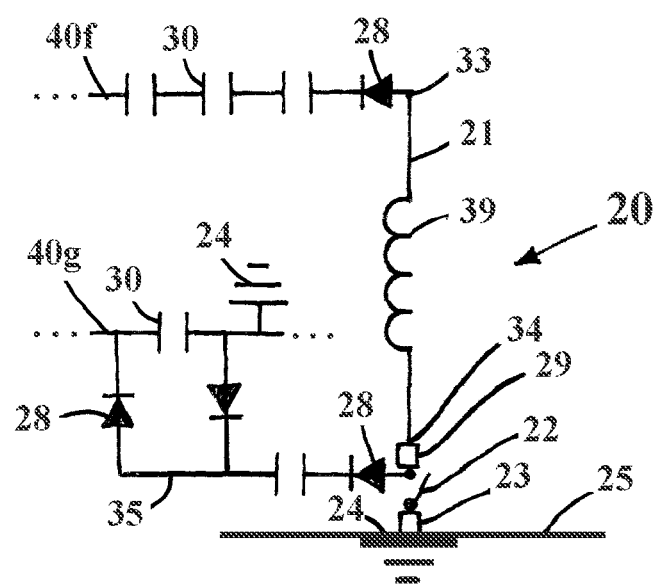

FIG. 10, shows the use of a capacitor in a circuit, and a DC multiplier in another circuit.

Figure 11:
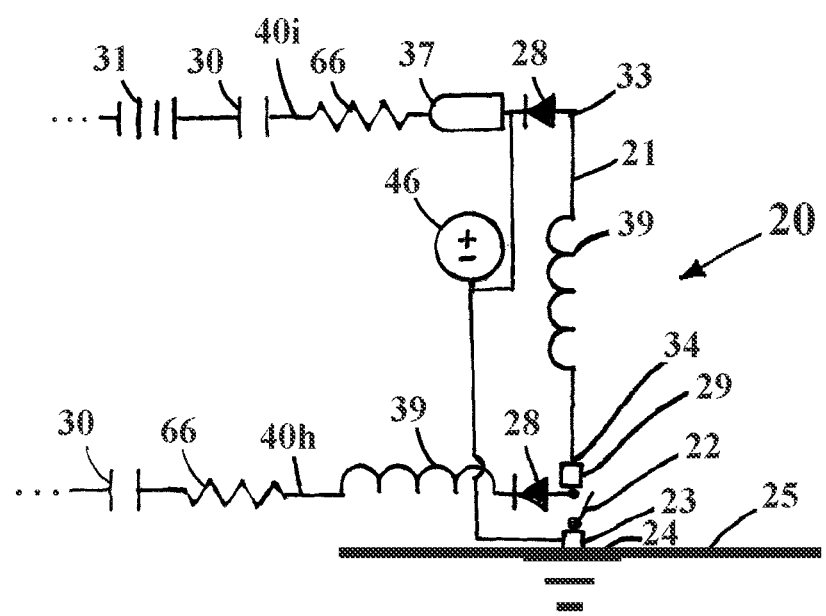

FIG. 11, shows the use of an inductor in a circuit, and an amplifier in another circuit.

Figure 12:
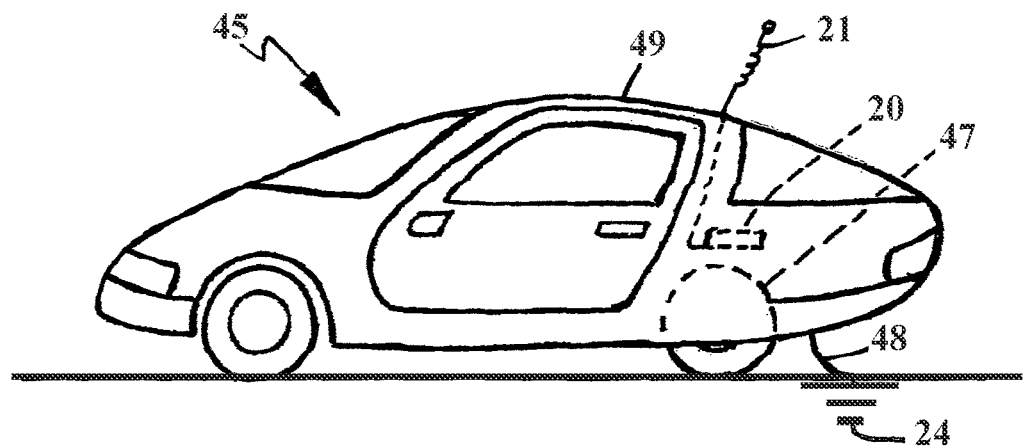

FIG. 12, shows an automotive application including an antenna and receiver device.

Figure 12A:
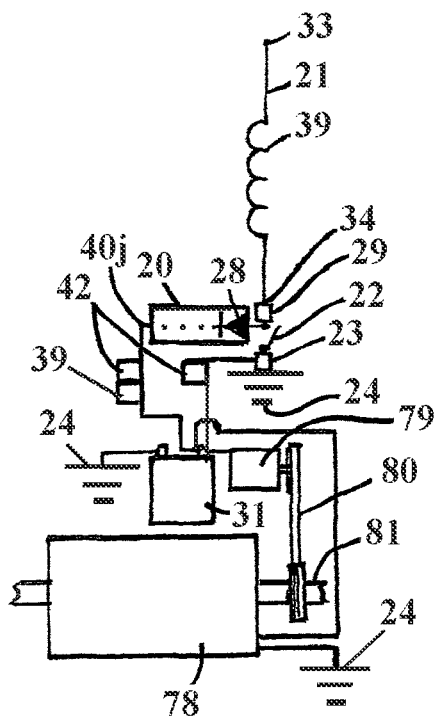

FIG. 12A, shows a schematic view of an automotive application including an antenna and a receiver device.

Figure 13:
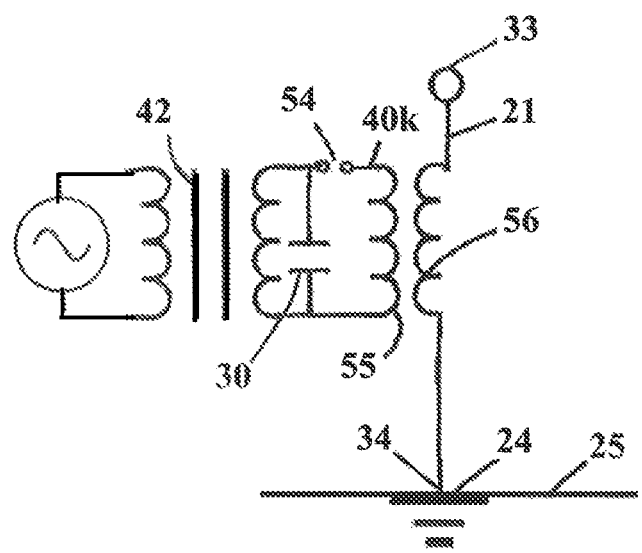

FIG. 13 shows a prior art electrical schematic of a conventional Tesla coil.

Figure 14:
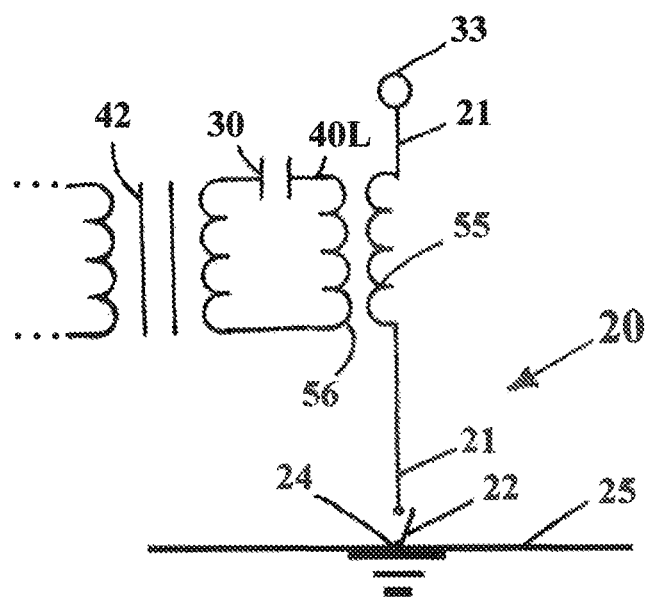

FIG. 14 shows a modification to the schematic of a Tesla coil in drawing FIG. 13, showing the elimination of the original capacitor and spark gap, and use of a single capacitor.

Figure 15:
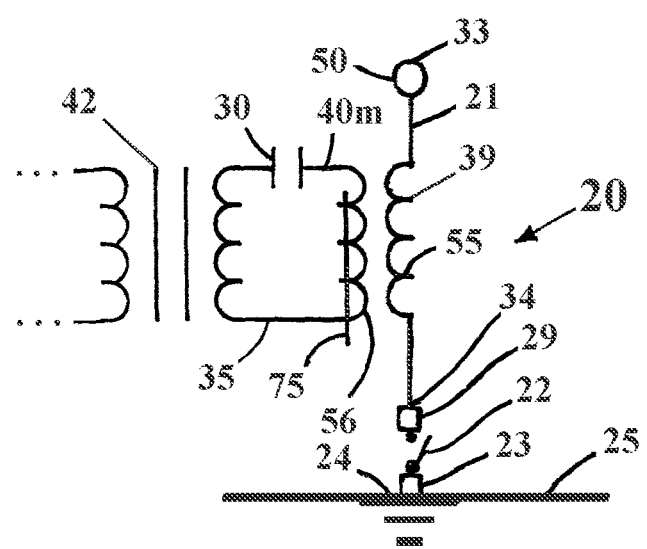
Figure 16:
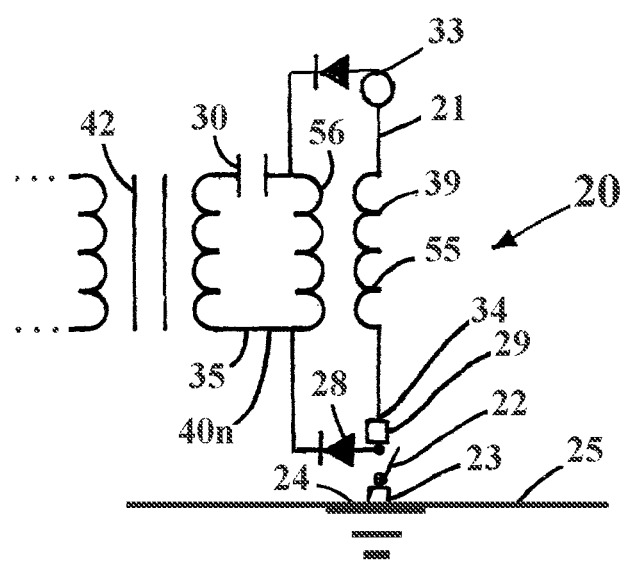

FIG. 15 shows an antenna including a primary coil in communication with a switch for opening and closing its conductive path to ground and a magnetic amplifier. IDC-B1,AMD FIG. 16 shows an antenna including a primary coil in communication with a switch for opening and closing its conductive path to ground.

Figure 17:
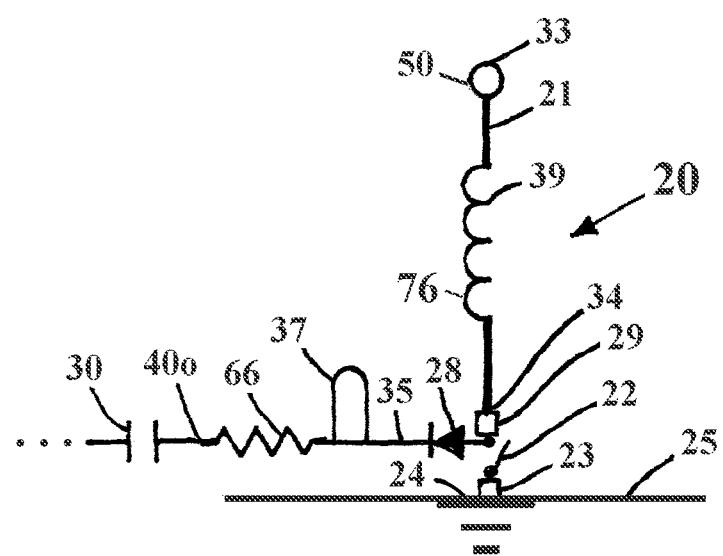

FIG. 17 shows an antenna including a primary coil in communication with a switch for opening and closing its conductive path to ground and an amplifier.

Figure 18:
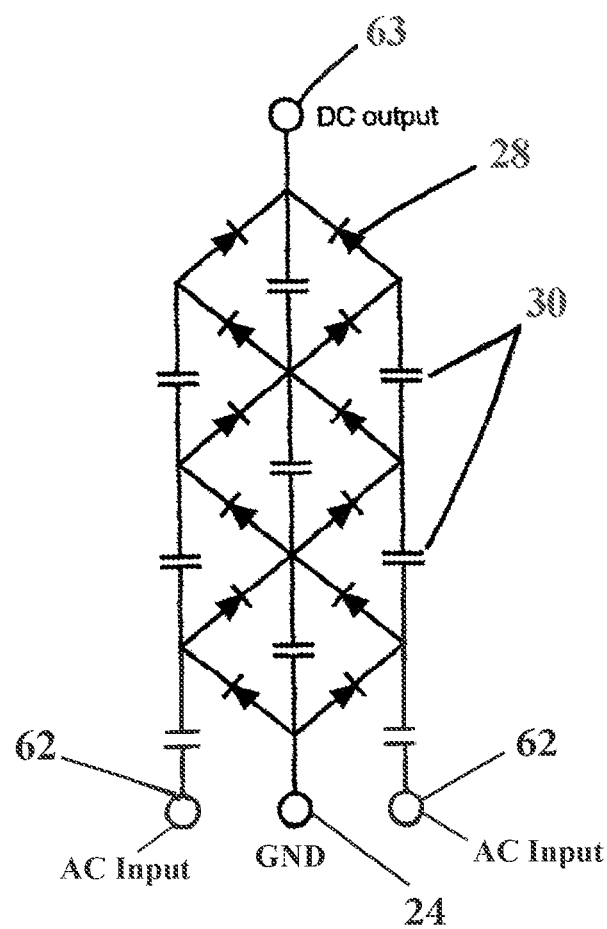

FIG. 18 shows a prior art DC multiplier circuit used in a Cockcroft-Walton generator.

Figure 19A:
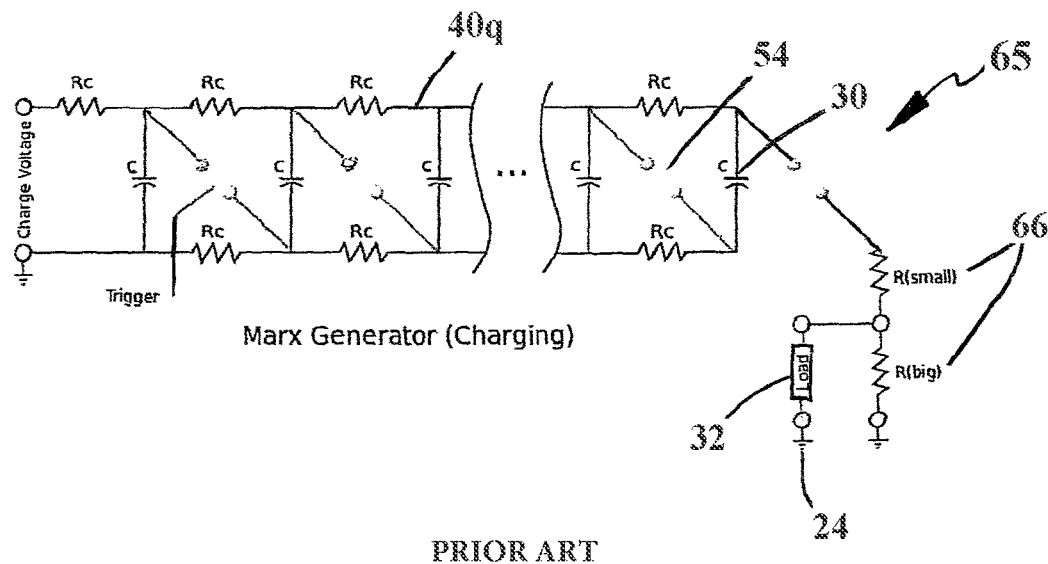

FIG. 19a shows a prior art circuit used in a Marx generator when it is charging.

Figure 19B:
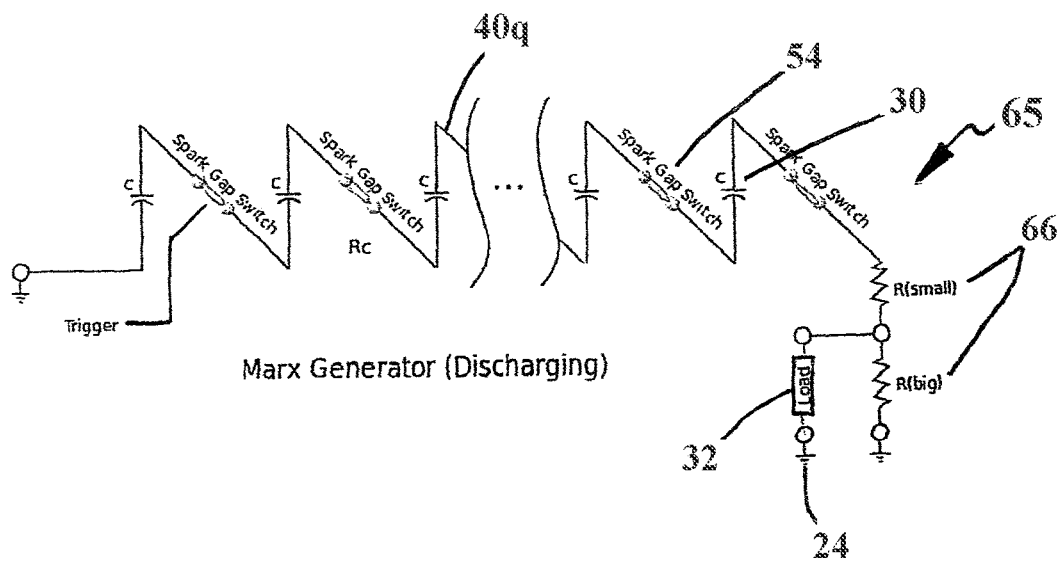

FIG. 19b shows a prior art circuit 40 used in a Marx generator when it is discharging.

Figure 20:
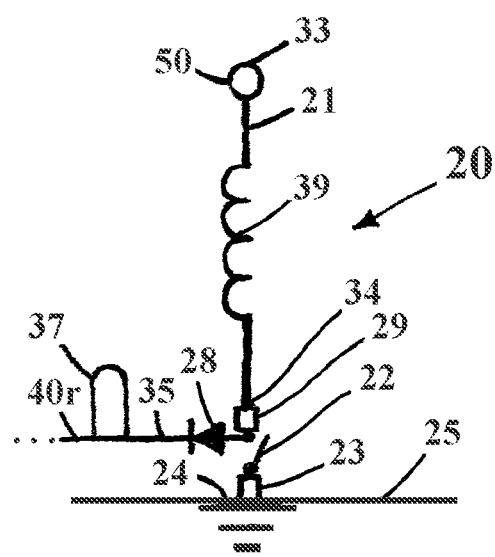

FIG. 20 shows an antenna that can be placed in direct communication with a circuit including an amplifier.

Figure 21:
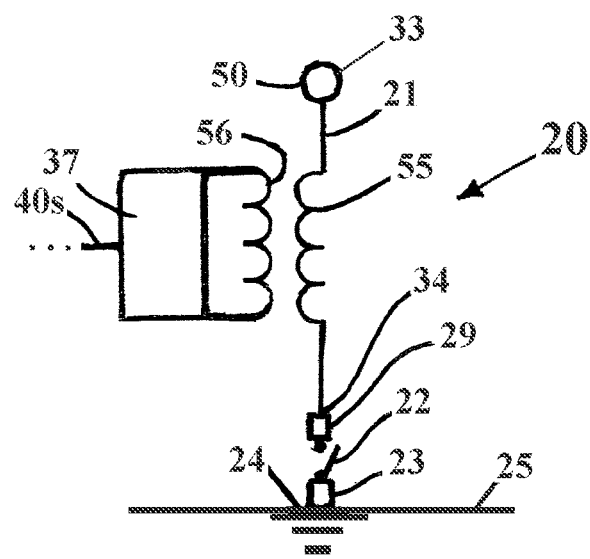

FIG. 21 shows an antenna that can be placed in electromagnetic communication with a circuit including an amplifier.

Figure 22:
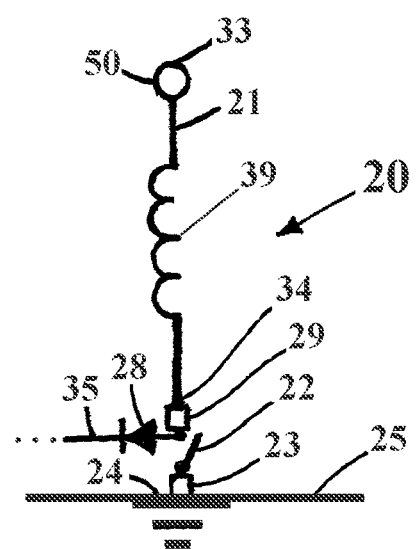

FIG. 22 shows an antenna having a sphere at the top end.

Figure 23:
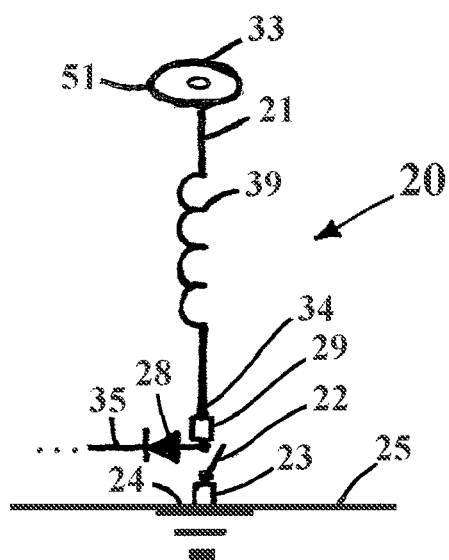

FIG. 23 shows an antenna having a toroid at the top end.

Figure 24:
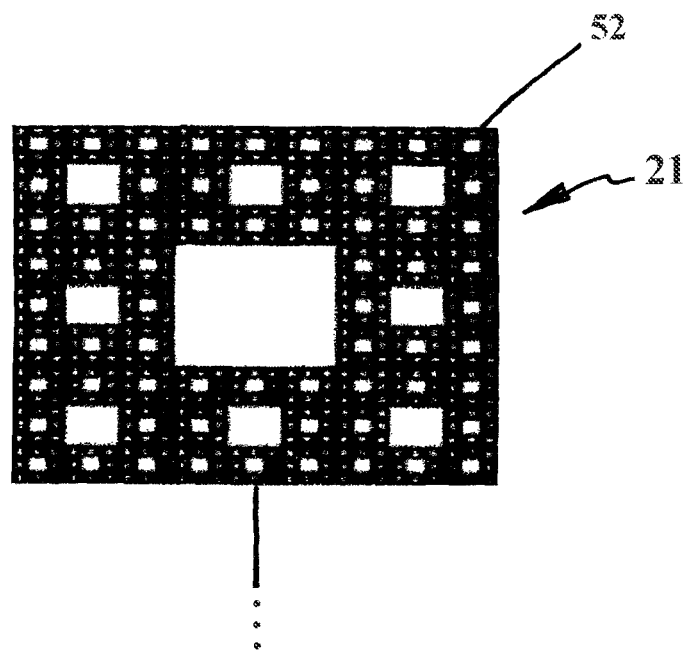

FIG. 24 shows a fractal antenna including a golden rectangle shape.

Figure 25:
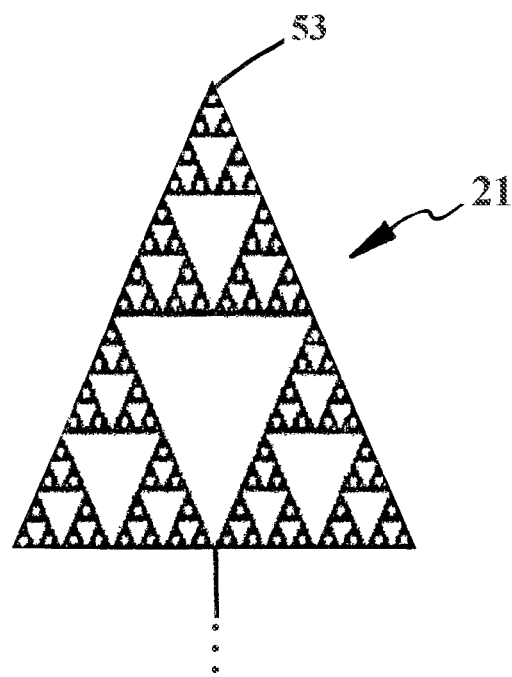

FIG. 25 shows a fractal antenna including a golden triangle shape.

Figure 26:
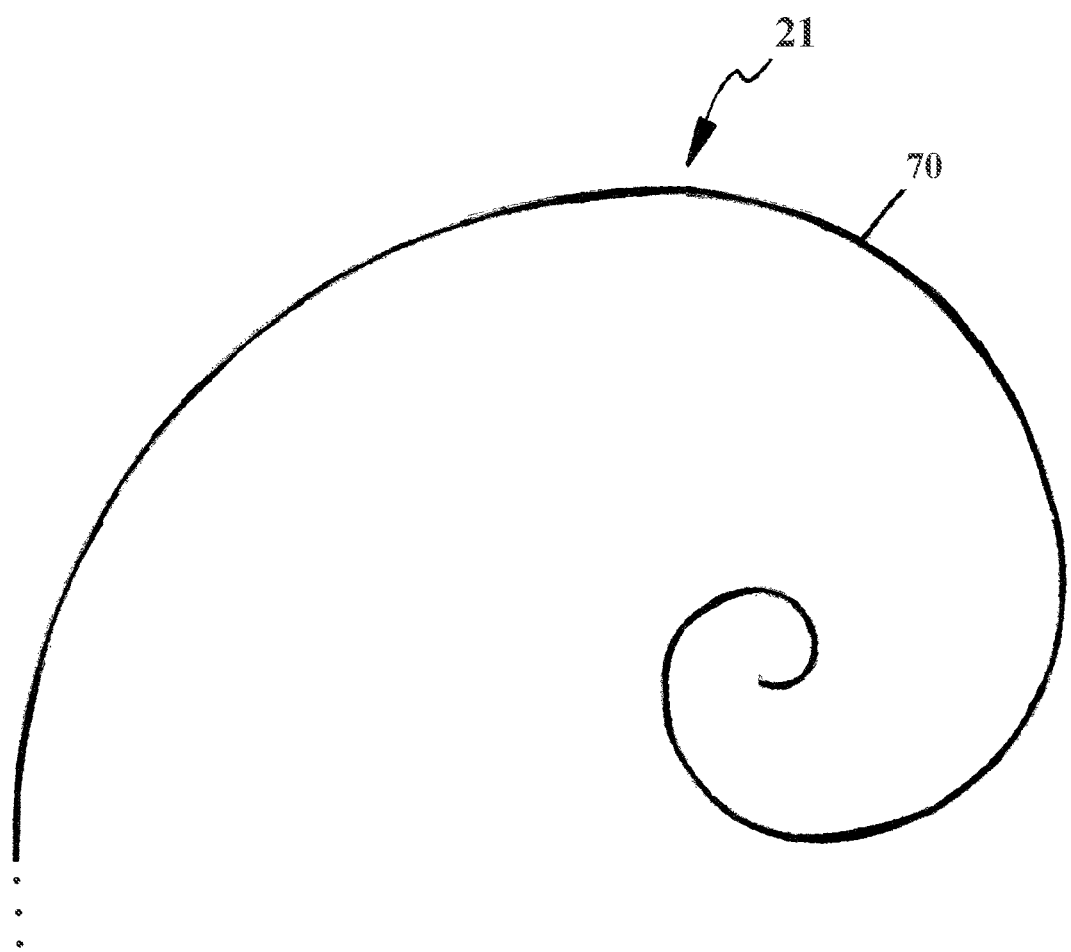

FIG. 26 shows a fractal antenna including a logarithmic spiral.

Figure 27:
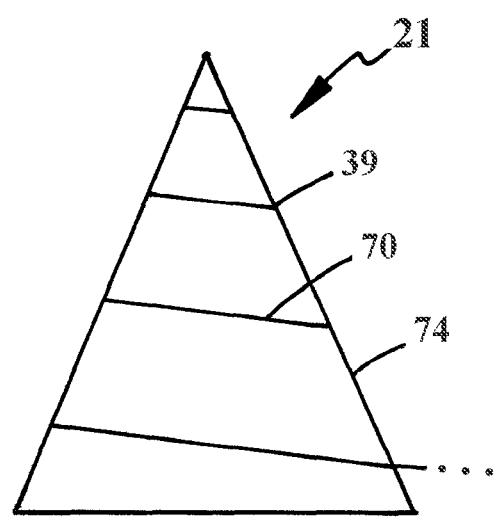

FIG. 27 shows a three-dimensional antenna including a logarithmic spiral.

Figure 28:
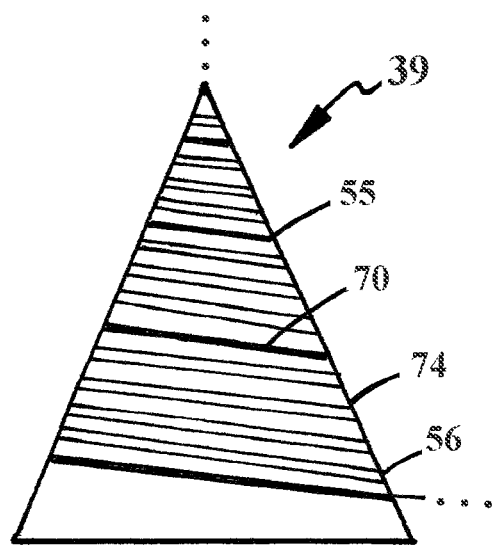

FIG. 28 shows a coil having a conical shape.

Figure 29:
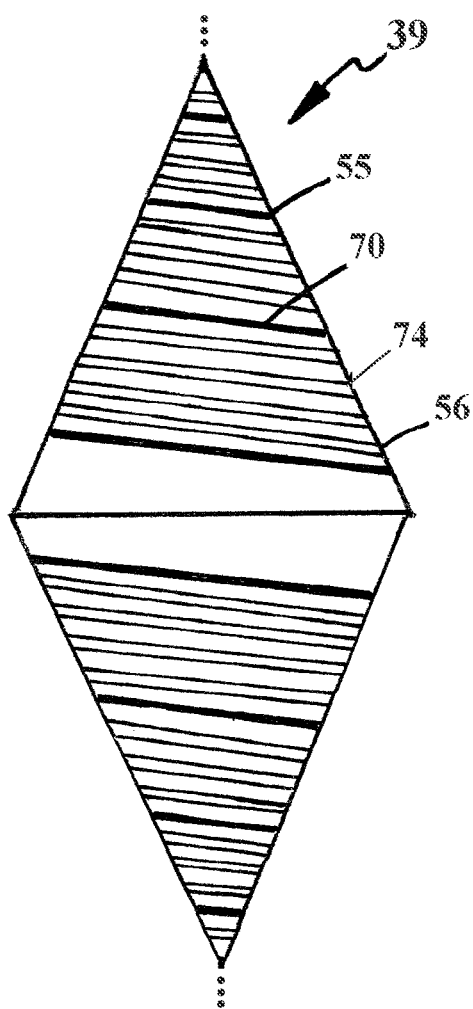

FIG. 29 shows a coil have two conical shapes.

Figure 30:
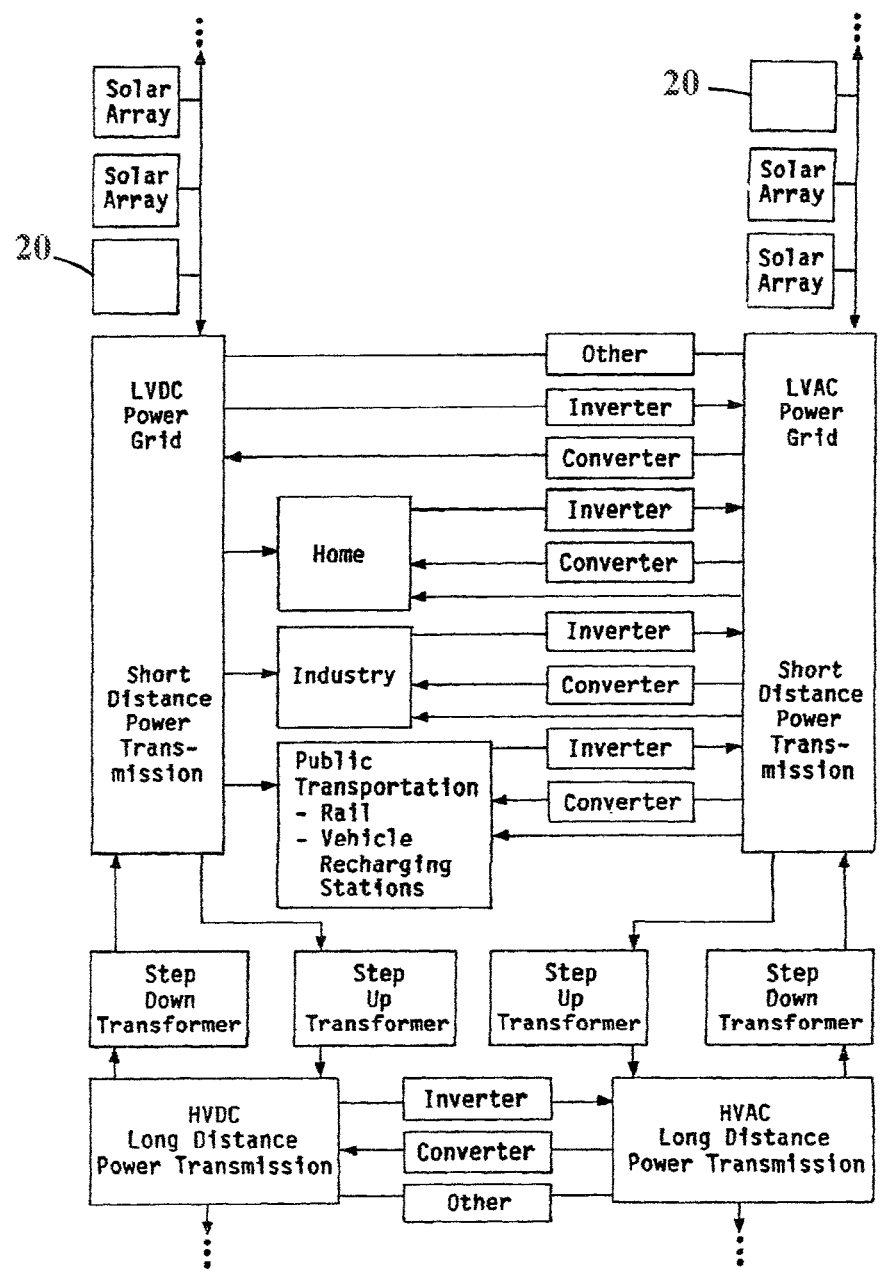

FIG. 30 shows a receiver device for obtaining electrical energy from the earth and its atmosphere connected to an electric power grid.

DETAILED DESCRIPTION

Although the present invention has been described with reference to preferred embodiments, workers skilled in the art will recognize that changes may be made in form and detail without departing from the spirit and scope of the invention.

Figure 1:
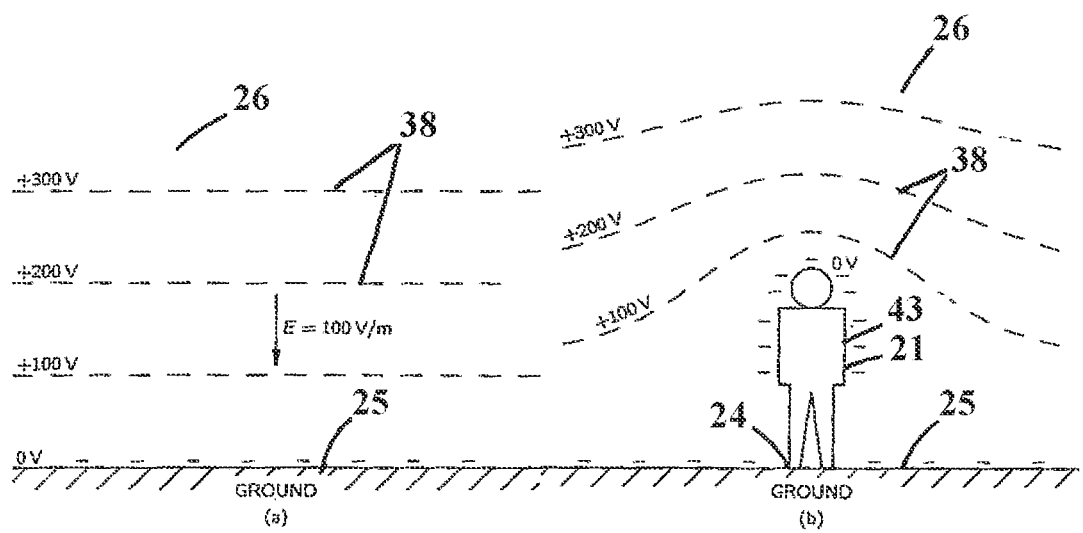
FIG. 1, is a reproduction of FIG. 9.1(a) in The Feynman Lectures on Physics, Volume II, Chapter 9, entitled "Electricity and the Atmosphere," but with the addition of numerals for reference purposes which shows there are gradients of about 100 volts of electrical potential for every three feet of elevation above level ground.

Drawing FIG. 1 is a reproduction of FIG. 9.1(a) in The Feynman Lectures on Physics, Volume II, Chapter 9, entitled "Electricity and the Atmosphere," but with the addition of numerals for reference purposes which shows on the left side of the drawing figure that there exists a gradient 38 of about 100 volts of electrical potential for every three feet of elevation above the level surface of the earth 25 at low elevations. Drawing FIG. 1 also shows on the right side of the drawing figure that this gradient 38 is caused to move upwards when a human being or other conductive object extends vertically and is in electrical communication with the earth 25 and ground 24.

Figure 2:
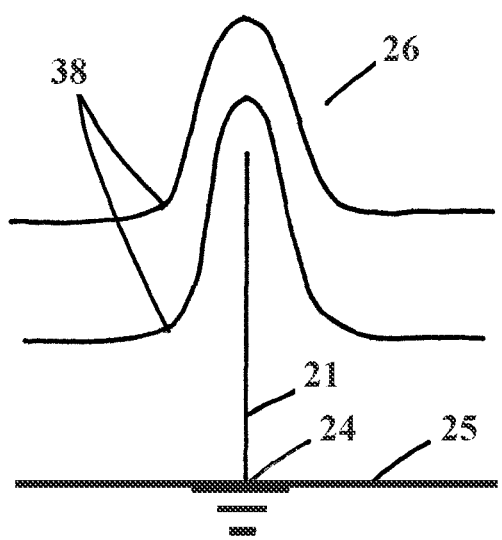
FIG. 2 shows that when a vertical monopole antenna or other conductive object is grounded the gradients of electrical voltage in the atmosphere are then shifted upwards.

Drawing FIG. 2 shows that when a vertical monopole antenna 21 or other conductive object is in communication with ground 24, the gradients 38 of electrical potential in the atmosphere 26 are then shifted upwards. In this regard, the resulting electrical potential and voltage measured as between the antenna 21 and ground 24 is then changed very little relative to the state normally maintained between the atmosphere 26 and ground 24 which is shown on the left side in drawing FIG. 1.

Figure 3:
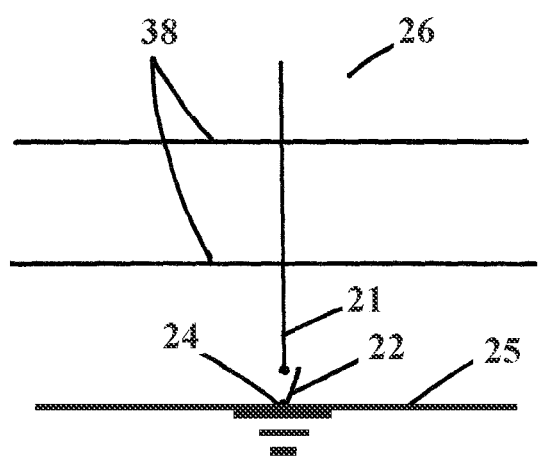
FIG. 3 shows that when the same monopole antenna shown in drawing

Drawing FIG. 3 shows that when a similar monopole antenna 21 or other conductive object is subsequently disconnected from ground 24 with the use of a switch 22, the electrical gradients 38 in the atmosphere 26 which correspond to approximately 100 volts every three feet will then shift downwards and return to their approximately normal condition and state as if the antenna 21 was not present.

Drawing FIG. 4 shows an antenna 21 having a top end 33 and a bottom end 34. The bottom end 34 is connected to a diode 28 which acts as a one-way door in circuit 40a and then prevents electrical energy and/or current from flowing back into the antenna 21. In this patent application, the word circuit can indicate a closed circuit or loop including ground, or an open circuit which does not include a complete loop or terminate to a ground. Further, the bottom end 34 of the antenna 21 is in communication with a switch 22 that can repeatedly open and close the antenna's 21 connection to ground 24. In this regard, the switch 22 can be mechanical and possibly include brushes or contacts, or be fluid-mechanical such as a mercury switch, or a switch can include and use optical sensors, hall effect sensors, magnetic sensors, or other electronic sensors, or possibly include a switching transistor circuit, and/or an integrated circuit possibly including a timing chip such as a 555 ic timer. The switch could be a spark gap. A vacuum tube such as a Western Electric 1B22 tube can be used to essentially make a spark gap and switch. Hydrogen thyratron tubes such as 3C45, 4C35, 5C22 can be used as switches and operate in micro and/or nanoseconds. Also shown is a variable speed control 23 for selectively changing and/or tuning the speed and/or dwell and contact time of the switch 22. The switch 22 can be used to cause the ground 24 connection of the antenna 21 to be controlled as desired or electrically engineered, and then be opened and closed hundreds, thousands, and even millions of times per second.

In this regard, the frequency at which the antenna 21 is being opened or closed in communication to ground 24 by a switch 22 can be selected as the driving frequency and the antenna length could then be tuned to that frequency, e.g., it could be the length of a half wave, or quarter wave, or other smaller fraction thereof. The tap or attachment point of the antenna in relation to the circuit could then be moved up and down on the length of the antenna to make the required tuning adjustment. Likewise, a tuner can be used with an antenna and/or antenna and coil combination in order to tune the antenna and/or antenna and coil combination in relation to the larger circuit and device. For this purpose, a capacitor such as an air capacitor 77 could be used. A coil or inductor on the antenna could also be tuned with a magnetic amplifier 75 to create a resonant antenna and circuit. It is also possible to target and then tune the antenna to Schumann Resonance(s) or other naturally occurring frequencies, and then select the frequency of the switching of the antenna on and off to ground and the related dwell time to maximize reception of energy. Further, it is possible to frequency hop and target multiple peaks and then combine and sum the energy from multiple Schumann Resonances, or other naturally occurring frequencies of electromagnetic energy.

When the antenna 21 shown in FIG. 4 is grounded the gradient of voltage in the atmosphere will be elevated relative to a normal state when no antenna 21 exists, or when the antenna 21 is not connected to ground 24. However, when the antenna 21 is suddenly disconnected from ground 24 the elevated electrical gradient of voltage in the atmosphere will move downwards and this will cause electrical energy to flow or be communicated and create a DC pulse of electric energy moving towards the bottom end 34 of the antenna 21. This electric energy or current can then pass through a diode 28 in circuit 40a which acts as a one-way door and prevents the electrical energy or current from being returned to the antenna 21. The diode 28 can be connected by wires 35 or other conductors 72 to a capacitor 30 or battery 31 for storage of electric energy, and/or to a different structure or device which provides a load 32. A resistor 66 can exist and/or be used between the diode 28 and capacitor 30.

When the switch 22 is subsequently closed and the antenna 21 is once again placed in communication with ground 34, the atmospheric electrical gradient will once again shift upwards and this will cause electrical energy or current in the antenna 21 to flow and create a DC pulse of electric energy to move towards the top end 33 of the antenna 21. The DC pulse will then be reflected off of the top end 33 and will move towards the bottom end 34 of the antenna 21. This can possibly cause the antenna 21 to resonate at the frequency associated with its design structure and length, and insofar as this takes place energy will be transmitted into the atmosphere and then be lost for possible use as a local source of electric power. The frequency of the antenna 21 can be selectively changed and/or tuned as desired with the use of other antenna structures and/or possibly by the use of a coil 39 or inductor 59 and/or the use of an antenna frequency tuning device 29 such as a movable tap tuner 76 or an air capacitor 77. Relevant information on prior art antenna tuners can be found on the following website: https://en.wikipedia.org/wiki/Antenna_tuner.

When the desire and intention is the transmission of radio waves or other frequencies of electromagnetic radiation, the antenna 21 can be resonant at the frequency at which the source of energy is alternating, and a usable signal for radio communication can be few hundred microvolts. A vertical half-wave or quarter-wave antenna can provide omnidirectional communications, and a resonant antenna will effectively radiate a radio signal for frequencies close to its design frequency. Resonance can be achieved by physically matching the length of the antenna to the wave and/or electronically matching the length of the antenna to the wave. In this regard, maximum electrical energy is communicated or current flows when the impedance is minimized. When the antenna is resonated so that its impedance is pure resistance, that is, when capacitive reactance is made equal to inductive reactance, they cancel each other, and impedance equals pure resistance. Further, in order to improve the ground connection of an antenna, a counterpoise can be used. In this regard, it is known to use six or more conductive lines or segments radiating out from a vertical antenna for the purpose of enhancing its ground connection when a good subsurface connection is not available or adequate for the task. In general, the length of wires or conductive elements that are used to create a counterpoise should be at least equal to or larger than the size of the antenna.

However, when the desire and intention is for the current 27 being generated in the antenna 21 to provide a wireless and/or hard wired source of electrical energy for storage and/or use with other electrical devices or load(s) 32, then the antenna 21 can be wired or otherwise be placed in electrical communication with a circuit 40a including means for receiving and storing electrical energy such as a capacitor 30 or battery 31, and/or be connected to an electrical device or load 32 which requires a source of electric power.

When an antenna's 21 connection to ground 24 is opened and closed many times per second, the result will be the generation of electrical energy or current and a series of DC pulses which can be collected from the bottom end 34 of the antenna 21 and then prevented from returning by the diode 28 in circuit 40a, and the DC electrical energy or current can then be stored in a capacitor 30 or battery 31, and/or be used to provide energy to an electrical device or load 32. A resistor 66 can exist and/or be used between the diode 28 and capacitor 30. In this regard, the output of pulsed DC electrical energy or current as shown on an Oscilloscope 68 could then resemble the image shown in drawing FIG. 6. The size of a capacitor 30 could possibly be small or large and even resemble that used in a Van de Graaff generator as disclosed in U.S. Pat. Nos. 1,991,236 and 2,922,905 by R. J. Van de Graaff, and these patents are hereby incorporated by reference herein.

Drawing FIG. 5 shows an antenna 21 having a top end 33 and a bottom end 34. The bottom end 34 of the antenna 21 is connected to a diode 28 which acts as a one-way door in circuit 40a and then prevents electrical energy or current from flowing back into the antenna 21. Further, the bottom end 34 of the antenna 21 is in communication with a switch 22 that can repeatedly open and close the antenna's 21 connection to ground 24. In this regard, the switch 22 can be mechanical and possibly include brushes, or be fluid-mechanical such as a mercury switch, or use optical sensors, hall effect sensors, magnetic sensors, or other electronic sensors and then possibly include a switching transistor circuit, and/or an integrated circuit possibly including a timing chip such as a 555 ic timer. The switch could be a spark gap.

A vacuum tube such as a Western Electric 1B22 tube can be used to essentially make a spark gap and switch. Hydrogen thyratron tubes such as 3C45, 4C35, 5C22 can be used as switches and operate in micro and/or nanoseconds. Also shown is a variable speed control 23 for selectively changing and/or tuning the speed and/or contact dwell time of the switch 22. The switch 22 can cause the ground 24 connection of the antenna 21 to be controlled and opened and closed hundreds, thousands, and even millions of times per second. The top end 33 of the antenna 21 is also connected to a diode 28 which acts as a one-way door in circuit 40*b* and prevents electrical energy or current from flowing back into the antenna 21.

When the antenna 21 shown in FIG. 5 is grounded the gradient of voltage in the atmosphere will be elevated relative to a normal state when there is no antenna 21 present and/or the antenna 21 is not connected to ground 24. However, when the antenna 21 is suddenly disconnected from ground 24 the elevated electrical gradient in the atmosphere will move downwards and this will cause electrical energy or current in the antenna 21 to flow and create a DC pulse of electric energy or current moving towards the bottom 34 of the antenna 21. This electric energy or current can then flow through diode 28 in circuit 40*a* that will prevent it from being returned to the antenna 21. In this regard, the diode 28 in circuit 40*a* can be connected by wires 35 or other conductors 72 to a capacitor 30 or battery 31 for storage, and/or to a structure or device which provides a load 32. A resistor 66 can exist and/or be used between the diode 28 and capacitor 30.

When the switch 22 is subsequently closed and the antenna 21 is once again in communication with ground 34, the atmospheric electrical gradient will once again move upwards and this will cause electrical energy or current in the antenna 21 to flow and create a DC pulse of electric energy or current to move towards the top end 33 of the antenna 21. This electrical energy or current can then flow through and be prevented from returning to the antenna 21 by diode 28 in circuit 40*b*. The output of pulsed DC current in circuit 40*b* as shown on an Oscilloscope 68 could then resemble the image shown in drawing FIG. 7. Further, the diode 28 in circuit 40*b* can be connected by wires 35 or other conductors 72 to a capacitor 30 or battery 31 for storage, and/or to a structure or device which provides a load 32. A resistor 66 can exist and/or be used between the diode 28 and capacitor 30.

When the antenna's 21 connection to ground 24 is being opened and closed many times per second, the result will be the generation of electrical energy or current and a series of DC pulses which can be conducted from both the bottom end 34 of the antenna 21 and also the top end 33 of the antenna 21 and then prevented from returning by the diodes 28 in circuits 40*a* and 40*b*, and the provided electrical energy can then possibly be stored in a capacitor 30 or battery 31, or be used to provide energy to an electrical device or load 32.

Drawing FIGS. 4 and 5 each show an antenna 21 in communication with an on and off switch 22, the speed and contact dwell of which can be manually or electronically tuned and/or controlled by a potentiometer or other speed control 23. The antenna 21 can then be alternatively placed in open and closed communication with ground 24. When the antenna 21 is switched on and off in connection with ground 24, the electrical gradients 38 as between the earth 25 and its atmosphere 26 will then alternate between and resemble the different states shown in drawing FIGS. 2 and 3. When the antenna 21 is switched on and off, the gradients 38 of electrical voltage present in the atmosphere 26 can be caused to move up and down, change potential, and/or dance along the length of the antenna 21. This causes a change of potential or movement of electrical energy and possibly a flow of electrons and/or an electrical pulse resulting in current 27, which is represented using a double headed arrow in drawing FIGS. 4 and 5, to then alternatively change in potential and/or move up and down in the antenna 21.

As shown in drawing FIGS. 6 and 7, the two DC electrical energy pulses or currents which are obtained from the top end 33 of the antenna 21 in circuit 40*b* and bottom end 34 of the antenna 21 in circuit 40*a* are out of phase.

As shown in drawing FIG. 8, it is possible to combine the two DC electrical energy pulses or currents obtained from the top end 33 and bottom end 34 of the antenna to produce a single DC output with the use of wires 35 or other conductors 72, two inverters 41, and two transformers 42 in two circuits 40*c* and 40*d*, which are then combined using a rectifier 36, such as a bridge rectifier. Relevant information on the structure and use of prior art rectifiers can be found on the website: https://en.wikipedia.org/wiki/Rectifier https://en.wikipedia.org/wiki/Mercury-arc_valve, https://en.wikipedia.org/wiki/Thyratron https://en.wikipedia.org/wiki/Thyristor, https://en.wikipedia.org/wiki/Power_MOSFET. In brief, the two DC currents are each changed to two AC currents using two inverters, and any possibly resulting mismatch in voltage and current between the two AC currents are then adjusted using two transformers so that they can be combined with the use of a rectifier 36, such as a bridge rectifier. The rectifier 36 can then be used to change the single provided AC current into a single DC electrical energy or current output. If desired, the electrical energy provided DC current can then be stored in a capacitor or battery.

Alternatively, as shown in drawing FIG. 9, it is possible for the two out of phase DC electrical energy pulses which are provided by the top end 33 and bottom end 34 of the antenna 21 to be combined in a single circuit 40*e* using a DC combiner 69. In this regard, a DC combiner can possibly include a phase shifter 47 in order to efficiently combine the two DC electrical energy or current outputs and generate a single resulting DC electrical energy or current output. If desired, the DC electrical energy or current output can be stored in a capacitor 30, battery 31, or be used by a load 32.

As shown in FIG. 10, it can sometimes be useful to direct the DC electrical energy or current obtained from the bottom end 34 of the antenna 21 and the DC electrical energy or current obtained from the top end 33 of the antenna 21 into circuits 40*f* and 40*g*. In this regard, circuit 40*f* shows the possible use of capacitors 30 that are designed and engineered to store and release the provided electrical energy when it reaches a desired value and/or temporal interval. A resistor 66 can exist and/or be used between the diode 28 and a capacitor 30. When DC current is directed into a capacitor, the anode and cathode sides of the capacitor will become filled with positive and negatively charged electrons. However, once the capacitor is filled the flow of current will stop and the accumulation of electrical potential and energy will then be stored, that is, unless the capacitor is subsequently discharged or placed in communication with a load. In this regard, it is possible to use multiple capacitors in a series with each consecutive capacitor having at least equal or greater energy storage capacity in order to create a resulting large store of electrical energy and power as shown in circuits 40*f*. This can be likened to using a quart container to fill a half gallon container, and then a half gallon container to fill a gallon container, and then gallon container to fill a five gallon container, and then a five gallon container to fill a 55 gallon drum. When a 55 gallon drum, or large capacitor is filled and later suddenly discharged, it can provide more power or work per unit time than a small capacitor. For this purpose, an electrolytic capacitor which is designed and engineered to provide rapid charging and discharging of current can be used. Some electrolytic capacitors can also provide a temporary electret effect, and/or can be caused to discharge by certain frequencies. In drawing FIG. 10, one or more capacitors and/or electrolytic capacitors 30 can be used in circuit 40g. A resistor 66 can exist and/or be used between the diode 28 and capacitor 30. Further, a DC capacitor or series of DC capacitors can be selectively discharged with the use of a switching circuit. The electric power can be provided to a battery 30, electric device or other load 32. As shown in drawing FIG. 10, the DC electrical energy or current present in circuit 40g can be increased in voltage by using a DC multiplier circuit 58 such as a duplex multiplier circuit as shown, or alternatively a triplex, quad or larger multiplier circuit including numerous diodes. Relevant information on prior art DC multiplier circuits can be found on the following website: https://www.electronics-tutorials.ws/blog/voltage-multiplier-circuit.html. The electric energy can then be provided to a capacitor 30, battery 31, electric device or other load 32.1

As shown in drawing FIG. 11, the pulse of DC electrical energy or current provided by circuit 40h can be increased in voltage with the use of a coil 39 or other inductor 59, e.g., an automotive ignition coil 60, a tesla coil 61, or a transformer 42. Relevant information on prior art induction coils can be found on the website: https://en.wikipedia.org/wiki/Induction_coil. Relevant information on prior art tesla coils can be found on the website: https://en.wikipedia.org/wiki/Tesla_coil. In this regard, a non-pulsed DC current will produce an electromagnetic field only for a short time when the associated circuit is turned on. However, a pulsed DC current can provide an electromagnetic field for a longer duration, and in particular, if the current output is modified for the sake of efficiency and power output with the use of a phase shifter 57. Automotive ignition coils 60 are known to take 12 volts of DC current from a car battery, and provide between 15,000-40,000 volts for discharging across the spark gap present in spark plugs for igniting gasoline fuel in internal combustion engines. Some ignition coils also include transformers which change DC to AC current.

Also shown in drawing FIG. 11, is the use of an amplifier 37 in circuit 40i. The amplifier 37 can be used to boost, filter, tune, or otherwise change and modulate electrical energy and the amplitude and/or frequency of an AC or DC signal or pulse. An amplifier 37 can be make made of a single vacuum tube, e.g. a multipactor tube disclosed and/or made by Farnsworth, a photomultiplier tube, and/or can be made and include multiple vacuum or gas filled tubes, a bolometer, an oscillator, a regulator, resonant circuit(s), indicators, controls, monitors, switches, and solid state elements such as transistors, capacitors, filters, resistors, diodes, chips, switching circuits, heat sinks, rectifiers, phase shifters, transformers, a fuse, a power supply, and whether these components and possibly others be used in partial or complete combination. A warm cathode tube amplifier 37, or alternatively a so-called cold cathode tube amplifier 37, a solid state amplifier 37, or a hybrid amplifier 37 can be used in circuit 40i to increase the strength of the electrical energy, electromagnetic signal or other electrical phenomenon, and/or to modify the voltage, current, and/or phase of the electrical energy or signal, to create an oscillating and/or resonant circuit, to rectify the electromagnetic or other form of electrical energy received by the antenna 21 which is being repeatedly switched open and closed to ground 34. It can be necessary to initially provide a different source of phantom electric power 46 for starting or powering up a conventional warm cathode amplifier 37 and/or the switch 22, but less or even no phantom power could be needed or required for operation of a warm or cold cathode amplifier 37 and/or switch 22 once the receiver device 20 is started and providing electrical energy.

As shown in drawing FIG. 12, in an automotive application, a battery 31 can be used to provide a continuous and/or phantom source of electric power. As disclosed by Carlos Benitez in Great Britain Patents GB 121561A1, GB191514311A1, GB191417811A, and BG 191505591A, it is possible to generate electrical energy and to maintain the same in at least two batteries with relatively little or possibly no energy loss, and all of these patents are hereby incorporated by reference herein.

The battery 31 can be connected in a circuit 40j to an ignition coil 60 for increasing the voltage of the provided current to a desired value, and/or to a transformer 42 for changing the provided voltage and current, and the electrical energy can then be used to power the switch 32, and the use of a possible amplifier 37, as well as electrical monitors, controls, instruments, and one or more of the circuits 40 disclosed herein, and other useful devices. However, once the antenna 21 which can also include a coil has been activated as a power source by alternatively opening and closing the switch 22 to ground 34, and the gradient 38 of electrical energy provided by the earth and its atmosphere is caused to change in potential and/or move up and down the antenna 21 resulting in the production of electric energy, a pulse, or current in circuit 40j, the power initially provided by the battery 31 and/or a different outside source of phantom power may not then be further required for the receiver device 20 to operate.

As shown in the schematic view drawing FIG. 12A, the battery 31 can be maintained with the use of a generator or alternator 79 that is driven by the electric motor 78, drive 81, or axle of the automobile, but can also possibly be maintained in whole or part by the electric power generated by the antenna 21 and receiver device 20, and the structures and methods disclosed by Benitez in the aforementioned Great Britain Patents GB 121561A1, GB191514311A1, GB191417811A, and BG 191505591A.

In automotive applications, it can sometimes be useful to include other structures in order to provide for a good electric ground. The use of carbon black in automobile tires 47 can cause them to be electrically conductive. Further, it is also possible to provide a conductive ground lead 48 under a transportation vehicle 45 to maintain contact with the surface of the earth and ground. In addition, it is known that the roof and other portions of the chassis of an automobile can serve as a counterpoise 49 in order to improve electric ground. In this regard, the Marine Corps "Antenna Handbook," MCRP 8-10B.11, published May, 2016, page I-24, states: "A 1.5 meter tuned whip will deliver adequately all of the signals that can be received at frequencies below 1 MHz." The MCRP includes the following information on page 2-14: "Therefore, it is essential to provide as good a ground or artificial ground (counterpoise) connection as possible when using a vertical whip or monopole." The MCRP includes the following information on page 2-23: "In some VHF antenna installations on vehicles, the metal roof of the vehicle (or shelter) is used as a counterpoise for the antenna."

Accordingly, the roof and other portions of the body and chassis of an automobile or transportation vehicle 45 can be used as a counterpoise in order to provide an enhanced ground connection, and then provide capacitance and a ready supply of electrons. However, there is a difference between an automobile that is wired positive ground as opposed to negative ground. Many of the automobiles made in America in the early 20th century were wired positive ground and then used 6 volt batteries. As a result of being wired positive ground, the lights of some vintage cars may not be as bright and the cranking power of their starters not be as high compared with modern 12 volt batteries and negative ground wiring configurations, but the starters of these older vehicles can be cranked for a long time without so rapidly depleting their 6 volt battery. While the United States largely switched to the use negative ground in automobiles by the 1950's, some automobiles made in England continued to be wired positive ground. One of the effects of being wired positive ground is that the entire chassis of the automobile is then used as a reservoir for electrons and is then potentially slowly being consumed. While the bodies of these cars can be stressed and then more subject to oxidation and corrosion, the wiring of these cars is not being used and consumed as a ready source of electrons as is the case when a car is wired negative ground. Depending upon the desires, intentions, and goals of the designer and end users, it could be advantageous to use positive ground in a transportation vehicle that would include an antenna 21 and receiver device 20 and other related structures and devices that would provide a source of electric energy and power derived from the earth and its atmosphere.

In non-mobile applications, the quality of a ground connection can be improved with the use of many structures and methods known in the electrical art field, and which are also approved by the electric code of the locality or country in which the application is to be made. For example, a copper rod driven into the soil, a ground screen, and conductive plumbing pipes have sometimes been used with the electrical installations found in residential and commercial buildings. It is known that Tesla created and discharged the equivalent of lightning bolts in his Colorado Laboratory. He then dug deep into the earth and buried conductive metallic structures and used carbon black in the form of coal dust, and continuously ran water over these areas to enhance the ground connection. Large radio antennas and stations commonly have substantially grounding structures to ensure a good ground connection.

Drawing FIG. 13 shows a conventional prior art circuit 40k for a Tesla coil. In brief, the electric power provided by an AC transformer 42 is used to charge a capacitor 30. When the capacitor 30 is discharged by the AC current as it alternates this provides enough electrical potential to cause the available voltage and current to jump the spark gap 54. The primary coil 55 in the circuit 40k imparts electrical energy by induction to the secondary coil 56 included in the antenna 21. At least a portion of the circuit 40k, and in particular, the antenna 21 will resonate and result in the antenna 21 accumulating substantial electric energy. When the electric charge builds to a high enough voltage and the dielectric properties of the surrounding local atmosphere break down, the top end 33 of the antenna 21 can discharge an electric steamer to a viable path to ground. It is important to recognize here that the spark gap 54 which Tesla used was essentially an air capacitor which had a relatively high dielectric in the form of air between the anode and cathode portions of the spark gap 54, e.g., a spark plug.

Drawing FIG. 14 shows an antenna 21 including a primary coil 55 in communication with a switch 22 for opening and closing its conductive path to ground 34. The primary coil 55 associated with the antenna 21 can transfer AC electrical energy to the secondary coil 56 in circuit 40L which is also caused to resonate. When the capacitor 30 in circuit 40L discharges and provide a pulse of electrical energy that will jump the spark gap 54, the resulting electrical output can be connected with a wire 35 or other conductor 72 to a transformer 42, battery 31, other electrical device, or load 32. As shown in drawing FIG. 14, it is possible to replace the capacitor 30 and spark gap 54 with a single capacitor 30 in circuit 40L, e.g., a modern electrolytic capacitor.

Drawing FIG. 15 shows an antenna 21 in communication with a switch 22 for opening and closing its conductive path to ground 34. When the antenna 21 is repeatedly switched on and off to ground 34, the atmosphere's 26 gradient of potential 38 is caused to change and move upwards and downwards along the length of the antenna 21 which results in the movement electrical energy or current. The primary coil 55 included in the antenna 21 then transfers energy to the secondary coil 56 included in circuit 40m. The circuit 40m can be caused to resonate and its electrical potential will increase until the capacitor 30 is caused to discharge. As a result, a relatively large and sudden DC pulse of electrical energy will be released which can if desired or required be changed or modified in voltage and current by a transformer, be provided to a load 32, and/or it can be stored in a capacitor 30 or battery 31. In drawing FIG. 15, the possible use of a magnetic amplifier 75 is shown in relation to the secondary coil 56 in circuit 40m, but a magnetic amplifier 75 could also or alternatively be used in relation to the primary coil 55. Relevant information on prior art magnetic amplifiers can be found on the following website: https://en.wikipedia.org/wiki/Magnetic_amplifier.

Drawing FIG. 16 shows an antenna 21 including a primary coil 55 which is in communication with a switch 22 for opening and closing its conductive path to ground 34. The bottom end 34 of the antenna 21 and also the top end 33 of the antenna 21 can be connected to at least one diode 28 in a circuit 40n which includes a secondary coil 56 and a capacitor 30. A resistor 66 can exist and/or be used between the diode(s) 28 and capacitor 30. When the antenna 21 is repeatedly switched open and closed to ground 34, the atmosphere's 36 gradient of potential 38 is caused to change or move upwards and downwards along the length of the antenna 21 which results in a change in potential or movement of electrical energy or current. The electrical energy or current provided to circuit 40n from the top end 33 and bottom end 34 of the antenna 21 will be DC and have a pulse waveform. A conventional capacitor 30 once filled with charge by DC current will prevent any more electrons from flowing and then essentially act as an off switch in an electrical circuit. However, some electrolytic capacitors can be discharged by certain frequencies, and other means for switching an electrolytic capacitor can also be used, e.g., a switching transistor circuit, and/or an integrated circuit possibly including a timing chip such as a 555 ic timer, and/or a spark gap, a vacuum tube such as a Western Electric 1B22 tube, or a hydrogen thyratron tube such as types 3C45, 4C35, 5C22 can be used as switches and operate in micro and/or nanoseconds. Also shown is a variable speed control 23 for selectively changing and/or tuning the speed and/or contact dwell time of the switch 22. The switch 22 can cause the ground 24 connection of the antenna 21 to be controlled and opened and closed hundreds, thousands, and even millions of times per second.

In this embodiment, the primary coil 55 can also transfer AC current to the secondary coil 56 by magnetic inductance and cause the capacitor 30 to discharge. If and when the DC pulse waveform could possibly interfere in whole or part with the AC current waveform provided by the primary coil 55 and secondary coil 56, or vice-versa, the speed and contact dwell of the switch 22 and resonant frequency of the antenna 21 and the primary coil 55 and secondary coil 56 and the electrical properties of the selected capacitor 30 and circuit 40n can be designed and engineered, or otherwise be modified with a phase shifter 57, magnetic amplifier 75, variable capacitor, resistor, tuner, or other electronic device in order to prevent the undesired loss of electrical energy. As a result, at least in part of the energy provided by the DC pulse and AC current can be included in the output of circuit 40n. The circuit 40n can be caused to resonate and its electrical potential will increase and the capacitor 30 then be caused to discharge. As a result, a relatively large and sudden pulse of electrical energy will be released which can be changed in voltage and current by a transformer, and/or be provided to a capacitor 30, battery 31, or load 32. The electrical output could be in the form of AC current, DC current, or a combination of both, and so if desired or required an inverter can be used to change AC to DC so that it can be stored in a battery 31, and/or the AC or DC current can be changed in voltage and current by a transformer, and used by a load 32.

Drawing FIG. 17 shows an antenna 21 in communication with a coil 39 and a switch 22 for opening and closing its conductive path to ground 34. The bottom end 34 of the antenna 21 can be connected to a diode 28 which is connected to a circuit 40o including an amplifier 37. A resistor 66 can exist and/or be used between the diode 28 and capacitor 30. When the antenna 21 is repeatedly switched open and closed to ground 34, the atmospheric 36 gradient 38 of electrical potential is caused to change or move upwards and downwards along the length of the antenna 21 which can result in the movement of electrical energy or current 27. The electrical energy or current provided to circuit 40o from the bottom end 34 of the antenna 21 will be DC and have a pulse waveform. The amplifier 37 can be used to modulate the input and then create a desired or needed form of electrical output. Relevant information on prior art amplifiers and including those identified by different amplifier classes can be found on the following websites, https://en.wikipedia.org/wiki/Amplifier, https://www.electronics-tutorials.ws/amplifier/amplifier-classes.html, https://www.powerelectronictips.com/amplifier-classes-power-efficiencies-faq/, https://www.electronics-tutorials.ws/amplifier/amp_5.html https://www.electronics-tutorials.ws/amplifier/amp_6.html.

Further, a gas filled tube, a vacuum tube, a cold cathode vacuum tube, a multipactor tube as disclosed or made by Farnsworth, a photomultiplier tube, or a bolometer can be used as an amplifier. The antenna 31, coil 39, amplifier 37, resistor 66, and capacitor 30 can be engineered and configured to be in resonance when in operation. Moreover, the capacitor 30 could be connected in series or parallel to another amplifier 37, resistor 66, and capacitor 30, and/or another complete unit including an antenna 21, coil 39, switch 22, diode 28, amplifier 37, resistor 66 and capacitor 30. If desired or required, the output can be changed in voltage and current by a transformer. AC current can be changed to DC using an inverter so that it can be stored in a battery 31 or used by a load 32. DC current can be changed to AC current using a converter, and the electrical output can be used by a load 32.

Drawing FIG. 18 shows a prior art DC multiplier circuit 40p used in a Cockcroft-Walton generator 64. The circuit 40p can include a plurality of capacitors 30 and diodes 28, AC input 62, ground 24, and DC output 63 which can be placed in electrical communication with a battery 31, or load 32. Relevant information on prior art Cockcroft-Walton generators can be found on the following website: https://en.wikipedia.org/wiki/Cockcroft%E2%80%93Walton_generator.

Drawing FIG. 19a shows a prior art circuit 40q used in a Marx generator 65 when it is charging, and drawing FIG. 19b shows a prior art circuit 40q used in a Marx generator 65 when it is discharging. The prior art circuit 40q used in a Marx Generator 65 includes a plurality of capacitors 30, spark gaps 54, resistors 66, ground 24, and load 32. Relevant information on prior art Marx generators can be found on the following website: https://en.wikipedia.org/wiki/Marx_generator.

Drawing FIG. 20 shows an antenna 21 in communication with a switch 22 for opening and closing its conductive path to ground 24. The bottom end 34 of the antenna 21 can be connected to a diode 28 which is connected to a circuit 40r including an amplifier 37. A multipactor tube disclosed or made by Farnsworth, a photomultiplier tube, or a bolometer can be used as an amplifier. A resistor 66 can exist and/or be used between the diode 28 and amplifier 37. When the antenna 21 is repeatedly switched open and closed to ground 24, the atmospheric 36 gradient 38 of electrical potential is caused to change or move upwards and downwards along the length of the antenna 21 which results in the movement of electrical energy or current 27. The electrical energy or current provided to circuit 40r from the bottom end 34 of the antenna 21 will be DC and have a pulse waveform. The amplifier 37 can be used to modulate the input from the antenna and/or ground and create a desired or needed form of electrical output.

When the output is stored in a capacitor 30 and is then discharged, a relatively large and sudden pulse of electrical energy can be released. If desired or required, the output can be changed in voltage and current by a transformer. AC current can be changed to DC using an inverter so that it can be stored in a battery 31, or used by a load 32. DC current can be changed to AC current using a converter, and the electrical output can be used by a load 32.

Drawing FIG. 21 shows an antenna 21 in communication with a switch 22 for opening and closing its conductive path to ground 34. When the antenna 21 is repeatedly switched open and closed to ground 34, the atmospheric 36 gradient 38 of electrical potential is caused to change or move upwards and downwards along the length of the antenna 21 which results in the movement of electric energy or current 27 in the primary coil 55. The current provided by electromagnetic inductance to the secondary coil 56 in the amplifier 37 included in the circuit 40s will be AC and can have sinusoidal wave form. A frequency tuner and/or phase shifter can be used with the antenna 21 and/or be possibly included in the amplifier 37 and/or circuit 40s. The amplifier 37 can be used to modulate the input and then create a desired or needed form of electrical output.

An electronic filter or choke can be used with the antenna 21, circuit 40s, or amplifier 37, but also with any of the antennas, circuits, or amplifiers disclosed herein. When the electrical energy is stored in a capacitor 30 and is then discharged, a relatively large and sudden pulse of electrical energy can be released. If desired or required, the electrical output can be changed in voltage and current by a transformer. AC current can be changed to DC using an inverter so that it can be stored in a battery 31, or used by a load 32. DC current can be changed to AC current using a converter, and the electrical output can be used by a load 32.

The antenna, circuit, and possible amplifier combinations disclosed herein which are part of a receiver device can provide electrical energy for use derived from the earth and/or its atmosphere. The energy has been there for millions of years, but it has not been tapped and harvested to a significant degree. The possible inclusion of oscillating and/or resonating circuits and antenna, and the use of components which are consistent with the previously recited cold cathode vacuum or gas filled tubes invented by Farnsworth which can approximate and/or exceed unity can provide for an amplifier and receiver device which can be efficient and provide electrical energy that can be used by electrical devices or loads, and/or stored for future use.

Drawing FIG. 22 shows a monopole antenna 21 having a sphere 50 at the top end 33. The inclusion of a sphere 50 can enhance the reception of the antenna 21.

Drawing FIG. 23 shows a monopole antenna 21 having a toroid 51 at the top end 33. The inclusion of a toroid 51 can enhance the reception of the antenna 21. The toroid 51 configuration or shape can be associated with the so-called golden ratio or divine proportion number phi, which to the fourth decimal has a value of 1.618. This number is generated by the ratio of sequential Fibonacci numbers, and can be associated with fractal geometric shapes and patterns. A toroid 51 can constitute and serve as a conventional or fractal antenna.

Drawing FIG. 24 shows a fractal antenna 21 including a golden rectangle 52 as the primary repeated shape in which the ratio of the length to the width of the rectangle 52 is the number phi which to the fourth decimal point is 1.618. In this regard, a relatively small fractal antenna can receive a wide broadband of frequencies and behave like a much larger conventional antenna because of the shape and patterns which can potentially be infinitely repeated and decreased in size. An antenna 21 can be made in a logarithmic spiral, and in particular, a golden spiral, and the spiral can be followed in a Mandelbrot set. Prior art information on fractal antennas can be found in the article entitled "Fractal Antenna Engineering: The Theory and Design of Fractal Antenna Arrays," published in IEEE Antennas and Propagation Magazine, Vol. 41, No. 5, October, 1999, and also in the following patents granted to Nathan Cohen U.S. Pat. Nos. 6,476,766, 7,145,513, and 10,030,917, and this information and also these patents are hereby incorporated by reference herein.

Drawing FIG. 25 shows a fractal antenna 21 including a golden triangle 53 as the primary repeated shape in which the ratio of the length to the width of the triangle 53 is the number phi which to the fourth decimal point is 1.618. In this regard, a relatively small fractal antenna can receive a wide broadband of frequencies and behave like a much larger conventional antenna because of the shape and patterns which can potentially be infinitely repeated and decreased in size.

Drawing FIG. 26 shows a fractal antenna 21 including a logarithmic spiral 70. The antenna 21 can be made in a logarithmic spiral 70, and in particular, a golden spiral 73. A golden spiral 73 can be made in three dimensions and have an annular shape, and/or a conical shape 74 resembling a pine cone. A logarithmic and/or golden spiral 73 can be followed in a Mandelbrot set 71. Prior art information on logarithmic spirals, golden spirals, and Mandelbrot set can be found at the following websites, https://en.wikipedia.org/wiki/Logarithmic_spiral, https://en.wikipedia.org/wiki/Golden_spiral, https://en.wikipedia.org/wiki/Mandelbrot_set.

Drawing FIG. 27 shows a three-dimensional antenna having a conical shape 74 including a coil 39 configured in at least one logarithmic spiral 70.

Drawing FIG. 28 shows a three-dimensional coil 39 having a conical shape 74 configured in at least one logarithmic spiral 70, a primary coil 55, and a secondary coil 56. The mass of the primary coil 55 and secondary coil 56 wires or conductive materials can be made to be approximately the same. Further, the ratio of the length of the secondary coil 56 wire or conductive material to the primary coil 55 wire or conductive material can correspond to phi 1.618/1, and in order to do this the relatively gauges of the wires or other conductive materials can be specifically selected. The direction of the electrical current or pulses in the primary coil 55 and secondary coil 56 can be engineered and configured to travel in the same direction, or alternatively the current or pulses can be configured to run in opposite directions in the primary coil 55 and secondary coil 56. The coil 39 can be part of a larger circuit 40 which is in communication with an antenna 21, diode, resistor, capacitor, transformer, battery, or load, and whether in partial or complete combination. Accordingly, a resonating circuit 40 similar to those disclosed herein including a coil 39 having phi geometry can be made.

Drawing FIG. 29 shows a three-dimensional coil 39 having two conical shapes 74 each configured in at least one logarithmic spiral 70, a primary coil 55, and a secondary coil 56. The mass of the primary coil 55 and secondary coil 56 wires or conductive materials used to make the coil 39 can be made to be approximately the same. Further, the ratio of the length of the secondary coil 56 wire or conductive material to the primary coil 55 wire or conductive material can correspond to phi 1.618/1, and in order to do this the relatively gauges of the wires or other conductive materials can be specifically selected. The direction of the electrical current or pulses in the primary coil 55 and secondary coil 56 can be engineered and configured to travel in the same direction, or alternatively the current or pulses can be configured to run in opposite directions in the primary coil 55 and secondary coil 56. The coil 39 can be part of a larger circuit 40 which is in communication with an antenna 21, diode, resistor, capacitor, transformer, battery, or load, and whether in partial or complete combination. Accordingly, a resonating circuit 40 similar to those disclosed herein including a coil having phi geometry can be made.

Drawing FIG. 30 shows a receiver device 20 for obtaining electrical energy from the earth and its atmosphere connected to an electric power grid 67.

Having thus described the invention, it should be apparent that numerous structural modifications and adaptations may be resorted to without departing from the scope and fair meaning of the instant invention as set forth hereinabove.

What is claimed is:

1. A device configured to receive electrical energy from an electrical potential derived from the earth and its atmosphere, the device comprising:
   an antenna comprising a length between a top end and a bottom end, said top end being disposed at a first elevation, said bottom end being disposed at a second elevation, said first elevation being vertically higher than said second elevation;
   a terrestrial earth ground; and
   a switch in electrical communication with said antenna and said terrestrial earth ground, said switch adapted to alternate between an open and a closed electrical connection with said antenna and said terrestrial earth ground many times per second by a variable speed control, whereby said electrical potential is caused to change along said length of said antenna corresponding with a frequency of said switch being manipulated between said open and said closed electrical connection resulting in the harvesting of a series of pulses of electrical energy.

2. The device of claim 1, further comprising a diode, at least one of said top end of said antenna and said bottom end of said antenna being in electrical communication with said diode.

3. The device of claim 2, further comprising a battery in electrical communication with said diode.

4. The device of claim 2, further comprising a capacitor in electrical communication with said diode.

5. The device of claim 1, further comprising a tuner in electrical communication with said antenna.

6. The device of claim 1, wherein said variable speed control comprises an electronic variable speed control in electrical communication with said switch.

7. The device of claim 1, further comprising an amplifier in electrical communication with said antenna.

8. The device of claim 7, wherein said amplifier comprises an amplifier selected from the group consisting of a gas filled tube amplifier, a vacuum tube amplifier, cold cathode tube amplifier, a Farnsworth multipactor tube amplifier, and a photomultiplier tube amplifier.

9. The device of claim 1, further comprising a transistor in electrical communication with said antenna.

10. The device of claim 1, wherein said antenna further comprises at least one coil.

11. The device of claim 10, wherein said coil comprises a primary coil and a secondary coil.

12. The device of claim 1, further comprising a circuit in electrical communication with said antenna.

13. The device of claim 12, said circuit adapted to resonate.

14. The device of claim 1, wherein said antenna is selected from the group consisting of: a monopole antenna, a fractal antenna, an antenna comprising a golden rectangle, an antenna comprising a golden triangle, an antenna comprising a golden spiral, a fractal antenna comprising a Mandelbrot set, an antenna comprising a sphere on said top end, an antenna comprising a toroid on said top end, an antenna comprising a coil, an antenna comprising a tuner, an antenna comprising a tuner comprising a tap, an antenna comprising a tuner comprising an air capacitor, an antenna comprising at least one resistor and at least one capacitor in electrical communication, an antenna comprising a transmitter, and an antenna comprising a counterpoise.

15. The device of claim 1, further comprising at least one electronic component in electrical communication with said antenna, the at least one electronic component selected from the group of electronic components consisting of: an amplifier, a magnetic amplifier, a battery, a conductor, a converter, a capacitor, an air capacitor, an electrolytic capacitor, a series of capacitors, a diode, a series of diodes, a Cockcroff-Walton generator, a coil, a coil comprising a conical shape, a coil comprising primary and secondary windings, a coil comprising a secondary winding comprising a length in the ratio of 1.618/1 relative to the primary winding, a DC combiner, a DC multiplier, a demultiplexer, a filter, an inductor, an inverter, a Marx generator, a master control, a wireless master control, a modulator, an oscillator, an on and off master power switch, an on and off phantom power switch, a phase shifter, a phantom power supply, a power output controller, an AC power supply, a DC power supply, a rectifier, a bridge rectifier, a resistor, a spark gap, a variable speed control switch, a tap, a transistor, a graphene transistor, a transformer, a transmitter, a tuner, a wire, a vacuum tube, a series of vacuum tubes, and, a visual display.

16. The device of claim 1, wherein said antenna is in electrical communication with a load.

17. The device of claim 1, wherein said antenna is in electrical communication with an electric motor in a transportation vehicle.

18. The device of claim 1, wherein said antenna is in electrical communication with an electric power grid.

19. A device configured to receive electrical energy from an electrical potential derived from the earth and its atmosphere, the device comprising:
an antenna comprising a length between a top end and a bottom end, said top end being disposed at a first elevation, said bottom end being disposed at a second elevation, said first elevation being vertically higher than said second elevation;
a terrestrial earth ground; and
a switch comprising an electronic variable speed control in electrical communication with said antenna and said terrestrial earth ground, said switch adapted to alternate between an open and a closed electrical connection with said antenna and said terrestrial earth ground many times per second, whereby said electrical potential is caused to change along said length of said antenna corresponding with a frequency of said switch being manipulated between said open and said closed electrical connection resulting in the harvesting of a series of pulses of electrical energy.

20. A device configured to receive electrical energy from an electrical potential derived from the earth and its atmosphere, the device comprising:
an antenna comprising a length between a top end and a bottom end, said top end being disposed at a first elevation, said bottom end being disposed at a second elevation, said first elevation being vertically higher than said second elevation;
a terrestrial earth ground;
a switch comprising a variable speed control in electrical communication with said antenna and said terrestrial earth ground, said switch adapted to alternate between an open and a closed electrical connection with said antenna and said terrestrial earth ground many times per second, whereby said electrical potential is caused to change along said length of said antenna corresponding with a frequency of said switch being manipulated between said open and said closed electrical connection resulting in the harvesting of a series of pulses of electrical energy; and
at least one diode in electrical communication with said antenna, and at least one of an electrical storage device and a load in electrical communication with said antenna.

21. The device of claim 1, wherein said switch comprises a switch selected from the group consisting of a mechanical switch, a fluid-mechanical mercury switch, an optical switch, a spark gap switch, an electronic circuit and timing chip switch, a transistor switch, a gas filled tube switch, a vacuum tube switch, and a hydrogen thyratron tube switch.

22. The device of claim 1, wherein said antenna comprising a fractal configuration selected from the group consisting of at least one of a toroid, a golden square, a golden triangle, a golden spiral, and a fractal configuration produced by a Mandelbrot set.

23. The device of claim 10, wherein said coil comprising at least one of a tap tuner and an air capacitor tuner.

24. A method of producing electrical energy from the electrical potential derived from the earth and its atmosphere, the method comprising:

providing an antenna comprising a length between a top end and a bottom end, positioning said antenna such that said top end is disposed at a first elevation and said bottom end is disposed at a second elevation, said first elevation being vertically higher than said second elevation;

providing a ground to terrestrial earth;

providing a switch in electrical communication with said antenna and said ground, and alternating said switch between an open and a closed electrical connection between said antenna and said terrestrial earth ground many times per second by a variable speed control such that said electrical potential is caused to change along said length of said antenna corresponding with a frequency of said switch being manipulated between said open and said closed electrical connection resulting in the harvesting of a series of pulses of electrical energy.

25. The receiver device of claim 1, wherein said switch comprises an electronic switch comprising an integrated circuit comprising a timer chip.

26. The receiver device of claim 25, wherein said timer chip comprises a 555 ic timer chip.

27. The receiver device of claim 1, wherein said switch comprises an electronic switch comprising at least one of a vacuum tube and a gas filled tube.

28. The receiver device of claim 1, wherein said variable speed control comprises means for changing a speed and a contact dwell time of said switch.

29. The method of producing electrical energy of claim 24, wherein said switch comprises an electronic switch comprising an integrated circuit comprising a timer chip.

30. The method of producing electrical energy of claim 24, wherein said timer chip comprises a 555 ic timer chip.

31. The method of producing electrical energy of claim 24, wherein said switch comprises an electronic switch comprising at least one of a vacuum tube and a gas filled tube.

* * * * *